US011375058B2

United States Patent
Kuzhiyil

(10) Patent No.: US 11,375,058 B2
(45) Date of Patent: Jun. 28, 2022

(54) METHODS AND SYSTEMS FOR PROVIDING STATUS INDICATORS WITH AN ELECTRONIC DEVICE

(71) Applicant: Motorola Mobility LLC, Chicago, IL (US)

(72) Inventor: Francis Kuzhiyil, Deerfield, IL (US)

(73) Assignee: Motorola Mobility LLC, Chicago, IL (US)

( * ) Notice: Subject to any disclaimer, the term of this patent is extended or adjusted under 35 U.S.C. 154(b) by 127 days.

(21) Appl. No.: 16/910,606

(22) Filed: Jun. 24, 2020

(65) Prior Publication Data
US 2021/0409534 A1 Dec. 30, 2021

(51) Int. Cl.
| | |
|---|---|
| H04M 1/725 | (2021.01) |
| H04R 1/10 | (2006.01) |
| G06Q 10/10 | (2012.01) |
| G08B 5/36 | (2006.01) |
| H04M 1/72412 | (2021.01) |
| H04M 1/72442 | (2021.01) |

(52) U.S. Cl.
CPC .... *H04M 1/72412* (2021.01); *G06Q 10/1093* (2013.01); *G08B 5/36* (2013.01); *H04M 1/72442* (2021.01); *H04R 1/1041* (2013.01)

(58) Field of Classification Search
CPC .. H04M 1/05; H04M 1/6066; H04M 1/72412; H04M 3/568; H04R 1/1083; H04R 2201/10; H04R 29/00; H04R 5/033; H04W 4/02; H04W 4/023; H04W 4/16; H04W 76/11; H04W 76/14; H04W 8/005

USPC .......... 455/20, 456.3, 569.1; 348/14.12; 710/38; 463/20; 381/309; 340/636.1
See application file for complete search history.

(56) References Cited

U.S. PATENT DOCUMENTS

| | | | |
|---|---|---|---|
| 8,452,307 B1 * | 5/2013 | Fujisaki ............... | H04W 4/021 455/456.3 |
| 10,542,342 B1 * | 1/2020 | Betita ................... | G02B 6/001 |
| 2006/0025206 A1 * | 2/2006 | Walker ................ | G07F 17/3227 463/20 |
| 2009/0135017 A1 * | 5/2009 | Lee ........................ | H04M 1/05 340/636.1 |

(Continued)

OTHER PUBLICATIONS

"Creative Outlier Gold : Earbud Controls, LED indicators & Master Reset", YouTube Video—Published Jul. 2, 2019; Available at https://www.youtube.com/watch?v=hfUS9lcOuxc.

(Continued)

*Primary Examiner* — Tan H Trinh
(74) *Attorney, Agent, or Firm* — Philip H. Burrus, IV

(57) ABSTRACT

An electronic device includes one or more sensors, one or more processors operable with the one or more sensors, and a status indicator configured to indicate whether an authorized user of the electronic device is busy, free, or somewhere in between. The status indicator can operate in at least a first state and a second state that is different from the first state. The first state indicates the authorized user is busy and should not be disturbed, while the second state indicates the authorized user is free. Red light can be emitted in the first state, and green light in the second state. The state of the status indicator can be set manually, such as with a chopping (Continued)

gesture, or automatically, such as from a type of audio signal being received by a communication device of the electronic device.

20 Claims, 8 Drawing Sheets

(56) References Cited

U.S. PATENT DOCUMENTS

| | | | | |
|---|---|---|---|---|
| 2012/0005380 | A1* | 1/2012 | Batson | G06F 3/16 710/38 |
| 2013/0116015 | A1* | 5/2013 | Lee | H04R 1/1025 455/569.1 |
| 2015/0098598 | A1* | 4/2015 | Kulavik | H04S 1/005 381/309 |
| 2015/0296061 | A1* | 10/2015 | Geiger | G10L 15/26 348/14.12 |
| 2016/0006847 | A1* | 1/2016 | Usher | H04M 1/22 455/569.1 |
| 2019/0268698 | A1* | 8/2019 | Riha | H04W 4/02 |
| 2021/0006921 | A1* | 1/2021 | Munoz | H04S 7/301 |
| 2021/0152920 | A1* | 5/2021 | Gong | H04M 1/6066 |
| 2021/0373676 | A1* | 12/2021 | Jorasch | G06F 3/0487 |
| 2021/0374391 | A1* | 12/2021 | Jorasch | G06K 9/00362 |
| 2021/0407260 | A1* | 12/2021 | Kuzhiyil | G06F 1/1626 |

OTHER PUBLICATIONS

"Lumena Headset—Embrava", Viewed online Jun. 24, 2020; Published prior to filing of present application at https://embrava.com/pages/headset-busy-light-indicator.

"Luxafor Bluetooth LED Busy Light Indicator", Available on Amazon prior to Filing of Present Application; Viewed online Aug. 11, 2020 at https://www.amazon.com/.

"ROG Strix Fusion 700 Virtual 7.1 LED Bluetooth Gaming Headset", Viewed online Jun. 24, 2020 at https://www.amazon.com/ROG-700-Bluetooth-Amplifier-Microphone/dp/B07FK76DMF.

Cohen, Dan, "Jabra Engage 75 Headset Is a Headset Like No Other", Review on Gear Diary; Published Nov. 3, 2018; Available at https://geardiary.com/2018/11/03/jabra-engage-75-headset-is-a-headset-like-no-other/.

* cited by examiner

METHODS AND SYSTEMS FOR PROVIDING STATUS INDICATORS WITH AN ELECTRONIC DEVICE

BACKGROUND

Technical Field

This disclosure relates generally to electronic devices, and more particularly to electronic devices with visible output devices.

Background Art

Portable electronic device usage has become ubiquitous. Vast majorities of the population carry a smartphone, tablet computer, or laptop computer daily to communicate with others, stay in formed, to consume entertainment, and to manage their lives. As the technology incorporated into these portable electronic devices has become more advanced, so to has their feature set. It would be advantageous to have an improved electronic devices drawing new functionality from these new features.

Figure 1:
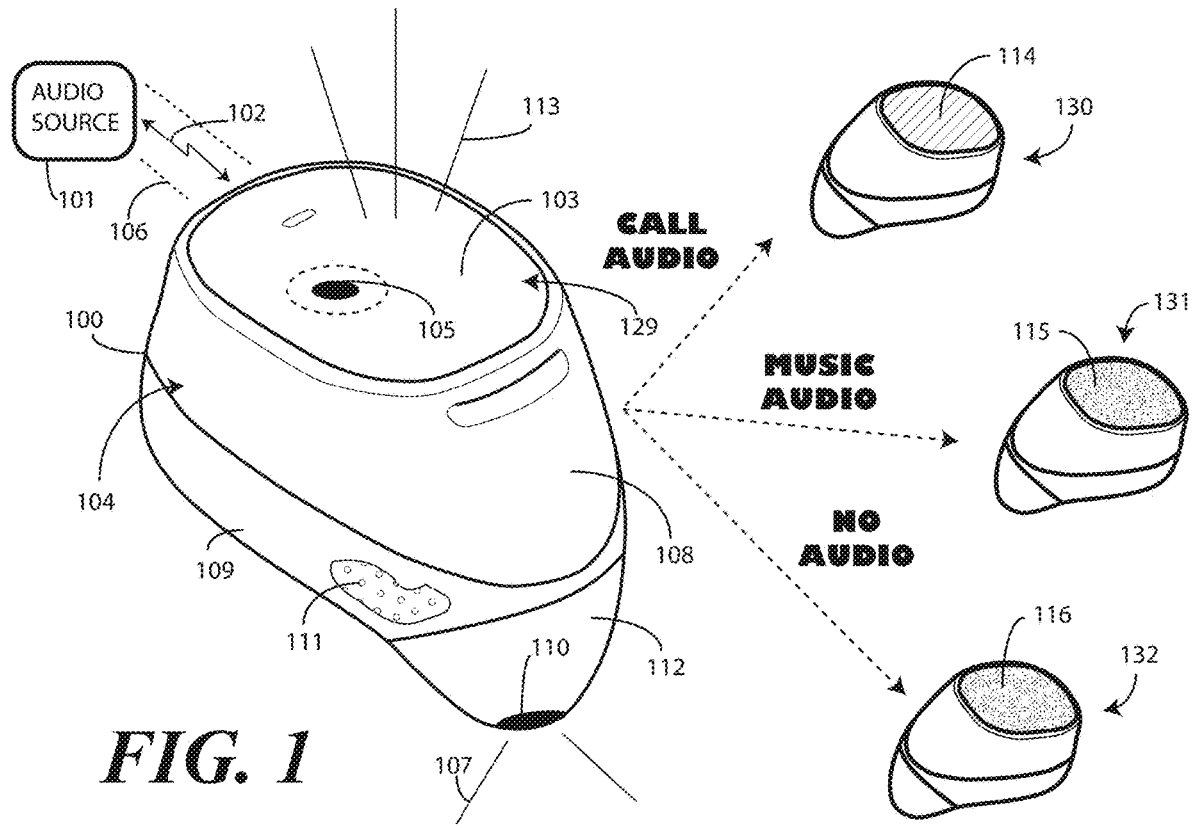
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to presenting a status indicator on an electronic device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of presenting status indicators from an electronic device as described herein. The non-processor circuits may include, but are not limited to, a radio receiver, a radio transmitter, signal drivers, clock circuits, power source circuits, and user input devices.

As such, these functions may be interpreted as steps of a method to perform the presentation of status indicators from an electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, directional terms such as "up," "down," "vertical," "horizontal," are intended to refer to the context of the electronic device being described. For example, a graphical object representing a rotatable item may be presented on a touch sensitive display or surface, where that touch sensitive display is shown in an elevation view around defined X, Y, and Z axes. In those examples, the X-Y plane will define the horizontal, with directions out of the page being defined as the negative Y direction and directions into the page being defined as the positive Y direction. Up will be defined as the positive Z direction and down will be defined as the negative Z direction. Thus, as described below when the rotatable item visually rotates "into the display" or "into the device" or "into the touch sensitive surface", this refers to visual rotation of the rotatable item occurs about an axis lying either within the X-Z plane (when presented in an elevation view), or in the X-Y plane, but askew the Y axis (when presented in a perspective view), with portions of the rotatable item to one side of the axis appearing to move in the positive Y direction, while other portions on the other side of the axis appear to rotate in the negative Y direction, and so forth.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that people sometimes interrupt others unintentionally when those others are wearing an audio delivery device, such as a headset or ear buds. Embodiments of the disclosure contemplate that this can occur because the person does not know what the other is doing while they are wearing the headset or ear buds. Advantageously, embodiments of the disclosure provide for an electronic device, which can be configured as a wearable electronic device such as a headset or one or more ear buds, but that includes a status indicator configured to display their status. Since status indicators configured in accordance with embodiments of the disclosure can present a person's status to others, so that those others can make a decision regarding whether to interrupt the person.

In one or more embodiments, the electronic device receives audio signals from a companion electronic device. The companion electronic device could be a local companion electronic device, such as a smartphone delivering music to one or more ear buds through a locally paired peer-to-peer network, or could be a remote device such as a server streaming music to the same one or more ear buds across a network. In one or more embodiments, one or more processors of the electronic device determine, from the received audio signals, what type of audio signals are being received. Examples of different types of audio signals include telephone call audio signals occurring when a person is engaged in a voice call with another person, music audio signals that are delivered from a music player in the companion electronic device, or other audio signals.

In one or more embodiments, the status indicator of the electronic device operates in a different state as a function if the type of audio signals being received. Illustrating by example, if the status indicator is configured to emit light that can be seen by others, in one or more embodiments when the audio type of the received audio is a first predetermined audio type, the one or more processors of the electronic device can operate the status indicator in a first state. In one or more embodiments, the status indicator emits red light when operating in the first state. If the audio type of the received audio is a second predetermined audio type, the one or more processors can operate the status indicator in a second state. In one or more embodiments, the status indicator indicates yellow light when operating in the second state. Accordingly, in one or more embodiments the one or more processors can cause the status indicator to emit red light when a person is on a voice call with another party, but emit yellow light when the person is listening to music.

In one or more embodiments, the one or more processors can operate the status indicator in a third state when there are no audio signals being received. Said differently, in one or more embodiments upon cessation of the receipt of audio signals from a companion electronic device, the one or more processors can operate the status indicator in the third state. In one or more embodiments, the status indicator emits green light when operating in the third state.

In one or more embodiments, the states of the status indicator identify a status function indicating a status of an authorized user of the electronic device. In one or more embodiments, red means the authorized user of the electronic device is busy and should not be interrupted, yellow means the authorized user of the electronic device is busy but can be interrupted, and green means the authorized user of the electronic device is not busy and is free to be interrupted.

Accordingly, embodiments of the disclosure provide an electronic device and corresponding methods configured to present a personal status identifier with the electronic device. Embodiments of the disclosure contemplate that with the ubiquity of electronic devices such as ear buds, some people wear ear buds or headsets constantly throughout the day. Embodiments of the disclosure contemplate that it can be difficult for a third party who sees a person wearing ear buds, for example, to know whether that person is talking on the phone where they prefer not to be interrupted, listening to music where they can be interrupted (since the music can be paused), or doing neither, in which they do not mind being interrupted.

Advantageously, embodiments of the disclosure provide electronic devices and corresponding methods for presenting a status identifier with an electronic device. In one or more embodiments, one or more processors of the electronic device receive actuation event input causing a status identifier to be presented. The actuation event input can take various forms. Illustrating by example, in one or more embodiments the actuation event input comprises a user gesture translating the electronic device in three-dimensional space to cause the status indicator to be presented. In other embodiments, the actuation event input comprises audio signals being received by the electronic device, such as when the electronic device receives audio signals corresponding to a telephone call. In still other embodiments, the actuation event input comprises commencement of an event stored in a calendaring application. Other examples of actuation event inputs will be described below with reference to FIG. 8. Still others will be obvious to those of ordinary skill in the art having the benefit of this disclosure.

In one or more embodiments, when an actuation event input is detected, one or more processors of the electronic device operate a status indicator at a user interface of the electronic device, thereby causing the status indicator to emit a status indicator output. Illustrating by example, in one or more embodiments the one or more processors cause a visible output of the electronic device, such as a light, display, or other illuminating device, to present the status indicator output. In another embodiment, an electronic device includes an illuminated indicator band positioned along the device housing of the electronic device that is configured to illuminate to provide the status indicator output. In still other embodiments, an electronic device is configured with a display that wraps about the sides of the electronic device, with those side portions presenting the status indicator. Other configurations of electronic devices capable of presenting the status indicator output will be obvious to those of ordinary skill in the art having the benefit of this disclosure.

In one or more embodiments, the status indicator comprises a visible output device presenting a predefined color to indicate a status of the user. Illustrating by example, when the status indicator is red, this may indicate that the user does not wish to be disturbed. When the status indicator is yellow, this may indicate that the user is occupied and is doing something, but does not mind being disturbed. When the status indicator is green, this may mean that the user is free and can be interrupted, and so forth.

To better illustrate how the status indicators of the present disclosure can be used, consider the situation where a user is in a conference call. In one or more embodiments, the methods and systems described below would present a red status indicator along the sides of the electronic device, thereby alerting third parties to the fact that the user is busy and should not be disturbed. Similarly, consider a student listening to music while doing homework or studying for an exam. The student may not mind being interrupted, but would like others to know that they are busy. Accordingly, the student may deliver user input to the electronic device causing a yellow status indicator to be presented. In a restaurant, the presentation of a status indicator indicating that one should not be disturbed would allow a waiter to see that the diner is busy and should not disturb the conversation. These are just a few examples of how the presentation of the status indicator in accordance with embodiments of the disclosure would be beneficial. Numerous others will be obvious to those of ordinary skill in the art having the benefit of this disclosure.

In one or more embodiments, a user delivers manual input to the electronic device to actuate the presentation of the status indicator. Illustrating by example, the user may make a gesture translating the electronic device in three-dimensional space to cause the status indicator to turn ON by transitioning to a first state. If the first state is not the desired state, in one or more embodiments the user repeats the gesture, transitioning from one state to the next with each gesture, until the desired status indicator is being presented. In one or more embodiments, the user can then turn the status indicator OFF by again repeating the gesture.

In one or more embodiments, the presentation of the status indicator is automatic.

Illustrating by example, in one or more embodiments one or more processors operation of the status indicator occurs as a function of audio signals being received by the electronic device. When a person is engaging in a telephone conversation, the one or more processors can cause the presentation of a status indicator output. When the call terminates, the one or more processors can transition the status indicator output from one type of output to another type of output, e.g., transition the status indicator output from red to green. In one or more embodiments, a user can define, when creating the event in the calendaring application, which status indicator output should be presented while the event is in progress.

When the one or more processors of the electronic device detect an actuation event input while the status indicator is not active, they can commence the presentation of the status indicator output. Where the actuation event input is a manual action, such a user gesture or a double-tap on a touch sensor, embodiments of the disclosure provide a natural, immediate, and intuitive method of actuating the status indicator without the necessity of navigating multiple menus or complicated applications. With an electronic device configured in accordance with embodiments of the disclosure, a user can trigger, activate, actuate, or initiate the presentation of a status indicator via simple gesture motions in one or more embodiments.

In one or more embodiments, the one or more processors of the electronic device initially, upon actuation, present the status indicator in a first state in response to the one or more processors detecting the actuation event. Using the red-yellow-green example from above, in one or more embodiments when the one or more processors detect the actuation event, they cause the status indicator to operate in a first state by emitting light with a first predefined color, such as red.

In one or more embodiments, while the one or more processors are operating the status indicator in the first state, the one or more processors continue to monitor for additional actuation event inputs. Continuing the red-green-yellow example, embodiments of the disclosure contemplate that a second actuation event input, such as a gesture motion translating the electronic device in a back and forth or chopping motion in three-dimensional space, may cause the one or more processors to transition the status indicator from operating in the first state to a second state. In one or more embodiments, the second state is different from the first state. Thus, the one or more processors may cause the status indicator to change from red to yellow, and so forth. This process can continue with the one or more processors transitioning the status indicator from yellow to green in response to a third actuation event input, and then from green to OFF in response to a fourth actuation event input, and so forth.

While color is one way of indicating a person's status that will be described for explanatory purposes below, the methods and systems for presenting the status indicator can be extended to other indicators as well. Illustrating by example, where the surfaces of a device housing have sufficient space to accommodate a display, the words "DO NOT DISTURB" may be presented on the display rather than a predefined color. Other examples of indicators for communicating the status of a user to third parties will be obvious to those of ordinary skill in the art having the benefit of this disclosure.

Turning now to FIG. 1, illustrated therein is one explanatory system in accordance with one or more embodiments of the disclosure. The system includes an audio source 101 and an electronic device 100, which is configured as a wireless ear bud in this illustrative example. While one ear bud is shown, it should be noted that where the electronic device 100 is configured as an ear bud, it will frequently be sold and/or used as a pair. Accordingly, in one or more embodiments the electronic device 100 comprises a first ear bud and a second ear bud. However, only one electronic device 100 is shown in FIG. 1 for simplicity. While the electronic device 100 of FIG. 1 is configured as an ear bud, embodiments of the disclosure are applicable to any number of other communication devices that are operable with an audio source 101.

The audio source 101 can take any number of forms. Illustrating by example, in one explanatory embodiment used for illustrative purposes in FIGS. 3-5 below the audio source 101 comprises a companion electronic device configured as a smartphone that is in communication with the electronic device 100 via a local area, peer-to-peer network. However, it should be obvious to those of ordinary skill in the art having the benefit of this disclosure that other audio sources may be substituted for the explanatory smartphone of FIGS. 3-5. For example, the audio source 101 could equally be a conventional desktop computer, palm-top computer, a tablet computer, a gaming device, a media player, or other device. In still other embodiments, the audio source 101 comprises a remote server or cloud server delivering electronic audio signals 102 to the electronic device 100 across a network. Accordingly, numerous other applications for embodiments of the disclosure will be obvious to those of ordinary skill in the art having the benefit of this disclosure.

In one or more embodiments, the electronic device 100 includes one or more user interface actuators 103 that allow a user to control the operation of the electronic device 100. In one embodiment the one or more user interface actuators 103 are configured as capacitive touch surfaces along a device housing 104 of the electronic device 100. However, in other embodiments the one or more user interface actuators 103 can be configured as push buttons, slider switches, touch pads, rocker switches, or other devices. Other examples of user interface actuators 103 include user actuation targets presented as virtual keys on a touch sensitive display. Still others can comprise voice commands delivered to a voice control interface. Even more others will be obvious to those of ordinary skill in the art having the benefit of this disclosure.

In this illustrative embodiment, the one or more user interface actuators 103 are equipped with a light output configured to project light through the surface of the one or more user interface actuators 103. By equipping the one or more user interface actuators 103 in such a manner, the one or more user interface actuators 103 can deliver a status indicator output that is visible by third parties.

In one embodiment, the electronic device 100 is configured to establish a wireless communication channel 106 with the audio source 101. In one embodiment, where the audio source 101 comprises a locally paired device such as a smartphone, the wireless communication channel 106 comprise local area, ad-hoc, peer-to-peer communications using a protocol such as Bluetooth.sup.™. Where the audio source 101 comprises a remote device, such as a cloud server in communication with the electronic device 100 across a network, other wide area protocols such as the transport protocol (TCP), the user datagram protocol (UDP), or another protocol can be used.

In this illustrative embodiment, the electronic device 100 receives electronic audio signals 102 from the audio source 101. The electronic audio signals 102 can be various types of audio signals. Illustrating by example, in one embodiment the electronic audio signals 102 comprise telephone call audio signals that are exchanged when the electronic device 100 is being used to communicate in a telephone call. In another embodiment, the electronic audio signals 102 comprise music audio signals, music playback audio signals, or music player audio signals that are exchanged when the electronic device 100 is being used to deliver acoustic audio signals 107 in the form of music to a user such as an MP3 recording of a song. Other examples of predefined types of audio signals received as electronic audio signals 102 from the audio source 101 will be obvious to those of ordinary skill in the art having the benefit of this disclosure. It should be noted that stereo music content is only one example of multi-content information that can be delivered in accordance with one or more embodiments of the disclosure, as information other than channel content may be transmitted as well. Data content may be interlaced with other content, such as audio or video. For example, the content may include left channel audio, right channel audio, and data like call initiation, transfer, or drop requests. Other content or information suitable for use with embodiments of the disclosure will be obvious to those of ordinary skill in the art having the benefit of this disclosure.

In one or more embodiments, when the electronic audio signals 102 are received, they are delivered to a transducer such as a local loudspeaker or other audio output device. In one or more embodiments, one or more processors of the electronic device 100 are then operable to determine, from the electronic audio signals 102, an audio type of the electronic audio signals 102. For example, the one or more processors of the electronic device 100 may analyze the electronic audio signals 102, audio source information, including connection information for the audio source 101, and so forth to determine, for instance, whether the electronic audio signals 102 are telephone call audio signals, music audio signals, or another type of audio signals, e.g., white noise audio signals.

In one or more embodiments, the electronic device 100 is capable of placement in either the right or left ear. Where the electronic audio signals 102 comprise multi-channel audio, e.g., a left channel and a right channel, the electronic device 100 can be configured with an orientation device so as to determine which ear it is in and, accordingly, which channel to be play. Where included, the orientation device can determine a physical orientation so as to play the proper channel. For example, if the electronic device 100 is one of a pair and is placed in the left ear, one or more control circuits of the electronic device 100 can select the left channel from the multi-channel audio information for delivery to its loudspeaker, and vice versa. One example of a suitable orientation device is an accelerometer, which can determine in which direction gravity is acting, and therefore in which ear each device is disposed. Where no orientation device is included, determining which wireless communication device plays the left channel or right channel can be user configurable. For example, a user may press a button, actuate a user interface actuator, deliver a voice command, and so forth.

The illustrative electronic device 100 of FIG. 1 includes an upper device housing 108 attached to a lower device housing 109. A circuit assembly is disposed within the electronic device 100, as well as a rechargeable battery, an acoustic driver, and other components.

In one or more embodiments, either the upper device housing 108 or the lower device housing 109 can define a microphone port to direct acoustic energy to one or more microphones of the circuit assembly. For example, such microphone ports can be disposed along the housing members to define acoustic beams along which acoustic energy is received. When the electronic device 100 is positioned in a user's ear, an acoustic beam can be directed toward the user's mouth so that the electronic device 100 can be used as a two-way communication device.

In the illustrative embodiment of FIG. 1, the lower device housing 109 defines an acoustic driver port 110. An acoustic driver can be positioned within the acoustic driver port 110. When the electronic device 100 is positioned within the user's ear, the acoustic driver can deliver acoustic audio signals 107 in the form of acoustic energy through the acoustic driver port 110 to the user's eardrum.

In one or more embodiments, the housing members are surrounded, or at least partially surrounded, by a soft, outer rubber layer 111. The soft, outer rubber layer 111, while optional, aids in user comfort by providing a soft surface against the contours of the user's ear. A cushion element 112 can be attached to the lower device housing 109 to provide an acoustic seal between a user's ear canal and the lower device housing 109. The cushion element 112 can be manufactured in varying sizes so that the electronic device 100 can be used in different sized ears.

In this illustrative embodiment, the upper surface of the electronic device 100 defines a user interface actuator 103disposed along the upper device housing 108. As used herein, a "user interface actuator" is a user interface element that can be actuated by a user to cause one or more control circuits of the electronic device 100 to perform an action. Examples of user interface actuators include push buttons, slider switches, touch pads, rocker switches, or other devices. Other examples of user interface actuators include user actuation targets presented as virtual keys on a touch sensitive display. Still others can comprise voice commands delivered to a voice control interface.

In the illustrative embodiment of FIG. 1, the user interface actuator 103 is defined by a capacitive touchpad formed by a flexible circuit substrate being placed beneath the upper surface of the upper device housing 108. The flexible circuit substrate includes a plurality of electrical conductors that define one or more electric field lines. It also includes a one or more light sources 105 that can project light through the upper surface of the upper device housing 108 to deliver a status indicator output, as will be explained in more detail below. In one or more embodiments, when a user places a finger along the upper surface of the upper device housing 109, these electrical field lines change, thereby actuating the user interface actuator 103.

It should be noted that while the electronic device 100 is shown illustratively as an ear bud in FIG. 1, in other embodiments the electronic device 100 can be configured as other types of devices configured to deliver acoustic audio signals 107 to a user. Illustrating by example, in another embodiment the electronic device 100 is configured as a pair of headphones. In another embodiment, the electronic device 100 is configured as an earpiece. Still other devices will be obvious to those of ordinary skill in the art having the benefit of this disclosure.

Figure 2:
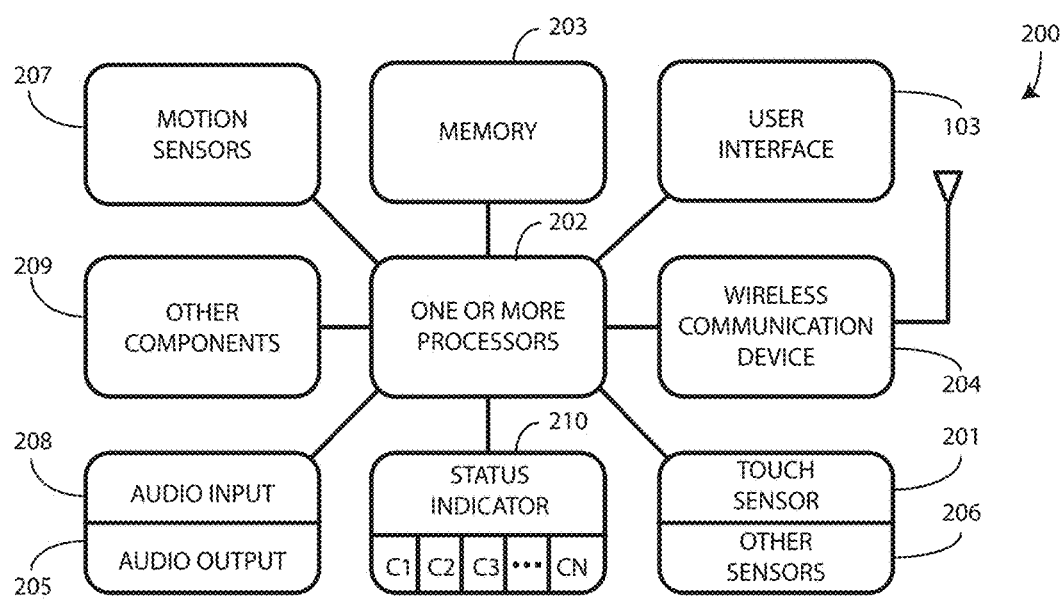
FIG. 2 illustrates one explanatory block diagram schematic for an electronic device in accordance with one or more embodiments of the disclosure.

Turning now to FIG. 2, illustrated therein is one explanatory block diagram schematic 200 of the explanatory electronic device (100) of FIG. 1. It should be understood that the block diagram schematic 200 of FIG. 2 is provided for illustrative purposes only and for illustrating components of one electronic device 100 in accordance with embodiments of the disclosure, and is not intended to be a complete block diagram schematic 200 of the various components that can be included with the electronic device (100). Therefore, other electronic devices in accordance with embodiments of the disclosure may include various other components not shown in FIG. 2, or may include a combination of two or more components or a division of a particular component into two or more separate components, and still be within the scope of the present disclosure.

In one or more embodiments, the block diagram schematic 200 is configured as a printed circuit board assembly disposed within a device housing (104) of the electronic device 100. Various components can be electrically coupled together by conductors or a bus disposed along one or more printed circuit boards.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

As noted above with reference to FIG. 1, in one or more embodiments the electronic device (100) includes a user interface actuator 103. In the embodiment of FIG. 1, the user interface actuator 103 was configured as a touch sensitive surface through which a light source (105) could project light of different colors. However, in other embodiments the user interface actuator 103 could be configured in other ways as well.

Illustrating by example, in one or more embodiments the user interface actuator 103 is configured as a display positioned on the upper surface of the upper device housing (108). In one or more embodiments, the display comprises a touch sensitive display. Where so configured, information, graphical objects, user actuation targets, and other graphical indicia can be presented using the display. Regardless of whether the user interface actuator 103 is configured as a display or touch sensitive surface, in one or more embodiments, so as to be touch sensitive, the user interface actuator 103 comprises a touch sensor 201.

In one or more embodiments, the touch sensor 201 can comprise any of a capacitive touch sensor, an infrared touch sensor, resistive touch sensors, inductive touch sensing, another touch-sensitive technology, or combinations thereof. Capacitive touch-sensitive devices include a plurality of capacitive sensors, e.g., electrodes, which are disposed along a substrate. Where so configured, each capacitive sensor can be configured, in conjunction with associated control circuitry, e.g., the one or more processors 202, to detect an object in close proximity with—or touching—the surface of the display(s) by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Other technologies include metal mesh, silver nano wire, graphine, and carbon nanotubes. Further, it is capable of being deposited in thin layers by way of a printing process. The capacitive sensors may also be deposited on the substrate by electron beam evaporation, physical vapor deposition, or other various sputter deposition techniques.

In one or more embodiments, users can deliver user input to the user interface actuator 103, be it a display or touch sensitive surface, by delivering touch input from a finger, stylus, or other objects disposed proximately with the user interface actuator 103. Where the user interface actuator 103 is configured as a display, in one or more embodiments it is configured as an active matrix organic light emitting diode (AMOLED) display. However, it should be noted that other types of displays, including liquid crystal displays, are suitable for use with the user interface and would be obvious to those of ordinary skill in the art having the benefit of this disclosure.

In one embodiment, the electronic device (100) includes one or more processors 202. In one embodiment, the one or more processors 202 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 200. Each of the application processor and the auxiliary processor(s) can be configured to process and execute executable software code to perform the various functions of the electronic device (100) with which the block diagram schematic 200 operates. A storage device, such as memory 203, can optionally store the executable software code used by the one or more processors 202 during operation.

In this illustrative embodiment, the block diagram schematic 200 also includes a communication device 204 that can be configured for wired or wireless communication with one or more other devices or networks. The networks can include a wide area network, a local area network, and/or personal area network. The communication device 204 may also utilize wireless technology for communication, such as, but are not limited to, peer-to-peer or ad hoc communications such as HomeRF, Bluetooth and IEEE 802.11 and other forms of wireless communication such as infrared technology. The communication device 204 can include wireless communication circuitry, one of a receiver, a transmitter, or transceiver, and one or more antennas.

In one embodiment, the one or more processors 202 can be responsible for performing the primary functions of the electronic device with which the block diagram schematic 200 is operational. For example, in one embodiment the one or more processors 202 comprise one or more circuits operable with the user interface actuator 103 to present presentation information to a user. Additionally, the one or more processors 202 can be operable with an audio output 205 to deliver audio output to a user. The executable software code used by the one or more processors 202 can be configured as one or more modules that are operable with the one or more processors 202. Such modules can store instructions, control algorithms, and so forth.

Various sensors 206 can be operable with the one or more processors 202. In one or more embodiments, the other sensors 206 include one or more proximity sensors can be configured to detect objects proximately located with the user interface actuator 103 or device housing (104) of the electronic device (100). The proximity sensors can fall in to one of two camps: active proximity sensors that include a transmitter and receiver pair, and "passive" proximity sensors that include a receiver only. Either the proximity detector components or the proximity sensor components can be generally used for gesture control and other user interface protocols in one or more embodiments. Either the proximity detector components or the proximity sensor components can be generally used for distance determination, such as measuring distances between objects situated within the environment of the electronic device and/or determining changes in distance between the electronic device (100) and objects situated within the environment.

As used herein, a "proximity sensor component" comprises a signal receiver only that does not include a corresponding transmitter to emit signals for reflection off an object to the signal receiver. A signal receiver only can be used due to the fact that an external source, such as the body of a person or other heat-generating object external to the electronic device 100, can serve as the transmitter. Illustrating by example, in one embodiment the proximity sensor components comprise only a signal receiver to receive signals from objects external to the device housing (104) of the electronic device (100). In one embodiment, the signal receiver is an infrared signal receiver to receive an infrared emission from a source, such as a human being, when the human being is approaching or near the electronic device (100).

Proximity sensor components are sometimes referred to as a "passive IR detectors" due to the fact that a person or other warm object serves as the active transmitter. Accordingly, the proximity sensor component requires no transmitter since objects disposed external to the housing deliver emissions that are received by the infrared receiver. As no transmitter is required, each proximity sensor component can operate at a very low power level.

In one embodiment, the signal receiver of each proximity sensor component can operate at various sensitivity levels so as to cause the at least one proximity sensor component to be operable to receive the infrared emissions from different distances. For example, the one or more processors 202 can cause each proximity sensor component to operate at a first "effective" sensitivity so as to receive infrared emissions from a first distance. Similarly, the one or more processors 202 can cause each proximity sensor component to operate at a second sensitivity, which is less than the first sensitivity, so as to receive infrared emissions from a second distance, which is less than the first distance. The sensitivity change can be effected by causing the one or more processors 202 to interpret readings from the proximity sensor component differently.

By contrast, "proximity detector components" include a signal emitter and a corresponding signal receiver, which constitute an "active" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers that define an active IR pair.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

In one or more embodiments the other sensors 206 include a skin sensor is configured to determine when the electronic device (100) is touching the skin of a person. For example, in one or more embodiments the skin sensor can determine when the electronic device (100) is placed within the ear of a user. In one embodiment, the skin sensor can include a substrate with an electrode disposed thereon. The electrode can confirm the object touching the skin sensor is skin by detecting electrical signals generated by a heartbeat in one embodiment. Other forms of skin sensors will be obvious to those of ordinary skill in the art having the benefit of this disclosure.

The other sensors 206 can include a light sensor. The light sensor can be used to detect whether or not direct light is incident on the device housing (104) of the electronic device 100 in one or more embodiments. The light sensor can also be used to detect an intensity of ambient light is above or below a predefined threshold in one or more embodiments. In one or more embodiments the light sensor can detect changes in optical intensity, color, light, or shadow in the near vicinity of the electronic device (100). The other sensors 206 can also include an audio input 208 in the form of one or more microphones that are operable to receive acoustic input. The other sensors 206 can also include a moisture sensor.

The electronic device 100 can include one or more motion sensors 207. The one or more motion sensors 207 can function as an orientation detector configured to determine a spatial orientation of the electronic device (100) in three-dimensional space. The one or more motion sensors 207 can include one or more accelerometers or gyroscopes. For example, an accelerometer may be embedded in the electronic circuitry of the electronic device (100) to show vertical orientation, constant tilt and/or whether the electronic device (100) is stationary. The measurement of tilt relative to gravity is referred to as "static acceleration," while the measurement of motion and/or vibration is referred to as "dynamic acceleration." A gyroscope can be used in a similar fashion.

In one or more embodiments, the one or more motion sensors 207 can detect motion of the electronic device (100). The one or more motion sensors 207 can be used to sense some of the gestures of a user as well. The one or more motion sensors 207 can be used to determine the spatial orientation of the electronic device (100) as well in three-dimensional space by detecting a gravitational direction. The one or more motion sensors 207 can also include an electronic compass to detect the spatial orientation of the electronic device (100) relative to the earth's magnetic field.

Other components 209 operable with the one or more processors 202 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers or other alarms and/or buzzers. The other components 209 can also include a mechanical output component such as vibrating or motion-based mechanisms.

In one or more embodiments, a status indicator 210 that is operable with the one or more processors 202. The status indicator 210 is operable to present a status identifier that is visible, audible, or both, to third parties.

Turning back to FIG. 1, in this illustrative embodiment the user interface actuator 103 and light source 105 work in tandem to provide status indicator output 113 through the surface of the user interface actuator 103. In one or more embodiments, the status indicator output 113 presents one of three colors 114,115,116 along the surface of the user interface actuator 103. In one or more embodiments, the three colors 114,115,116 comprise green, yellow, and red. These three colors 114,115,116 are illustrative only, as other colors will be obvious to those of ordinary skill in the art having the benefit of this disclosure. Moreover, while three colors 114,115,116 are used herein as an explanatory color set, in other embodiments the status indicator 210 will employ fewer than three colors 114,115,116. In still other embodiments, the status indicator 210 will employ more than three colors 114,115,116.

While color is one way of indicating a person's status that will be described for explanatory purposes below, the status indicator (210) can be configured to present information other than predefined colors as well. Illustrating by example, where the user interface actuator 103 is configured as a touch-sensitive display, the status indicator (210) may present the words "DO NOT DISTURB" or other graphical indicia rather than color. Other examples of indicators for communicating the status of a user to third parties in addition to color will be obvious to those of ordinary skill in the art having the benefit of this disclosure.

In the illustrative embodiment of FIG. 1, the electronic device 100 is shown with the status indicator (210) in four different states 129,130,131,132. In a first state 129, the status indicator (210) is inactive. In a second state 130, the status indicator (210) produces status indicator output 113 in the form of red light. In a third state 131, the status indicator (210) produces status indicator output 113 in the form of yellow light. In a fourth state 132, the status indicator (210) presents status indicator output 113 in the form of green light.

In one or more embodiments, the status indicator (210) comprises a visible output device presenting a predefined color of the three colors 114,115,116 to indicate a status of an authorized user of the electronic device 100. Illustrating by example, when the status indicator (210) is outputting red light, as shown at the second state 130, this indicates that the authorized user of the electronic device 100 does not wish to be disturbed. When the status indicator 210 is outputting yellow light, as shown at the third state 131, this indicates that the authorized user of the electronic device 100 is occupied and is doing something, but does not mind being disturbed. When the status indicator (210) is outputting green light, as shown at the fourth state 132, this indicates that the authorized user of the electronic device 100 is free and can be interrupted.

In one or more embodiments, the state of the status indicator (210) is a function of the audio type of the electronic audio signals 102 being received from the audio source 101. Illustrating by example, in one or more embodiments when the audio type of the electronic audio signals 102 is that of telephone call audio signals, this causes the status indicator (210) to enter the second state 130 and emit red light. By contrast, when the audio type of the electronic audio signals 102 is that of music audio signals, such as when a person is using the electronic device 100 to listen to music, this causes the status indicator (210) to enter the third state 131 and emit yellow light. In one or more embodiments, when no electronic audio signals 102 are being received by the electronic device 100, this causes the status indicator (210) to enter the fourth state 132 and emit green light.

While using the surface of the user interface actuator 103 to emit status indicator output 113 as the status indicator (210) as shown in FIG. 1 works well, embodiments of the disclosure contemplate that other forms of status indicators can be incorporated into electronic devices to provide the same function. Illustrating by example, in another embodiment an electronic device can include one or more indicator bands configured as a status indicator (210) for presenting the status of an authorized user of the electronic device to third parties. Such indicator bands can be positioned at various locations around the device housing. The indicator bands can comprise a semi-rigid polymer light pipe positioned above one or more light sources. The semi-rigid polymer light pipe can be manufactured from silicone, for example The semi-rigid polymer light pipe can comprise a continuous band disposed along the device housing. Alternatively, the semi-rigid polymer light pipe can be manufactured as one or more linear or non-linear strips, one or more interlaced linear or non-linear strips, a matrix of linear or non-linear strips, or in other configurations.

The semi-rigid polymer light pipe can contours matching those of the electronic device.

At least a portion of the semi-rigid polymer light pipe can extend distally beyond the surface of the device housing so as to more readily be seen. This results in a distal edge of the semi-rigid polymer light pipe being raised above the surface of the device housing.

In another embodiment an electronic device can includes one or more displays positioned along the device housing. In one or more embodiments, these one or more displays allow for the projection of color, text, or other visual indicia from the sides of the electronic device so that those colors, text, or visual indicia can be seen by third parties. Other examples of configurations of status indicators will be obvious to those of ordinary skill in the art having the benefit of this disclosure.

Figure 3:
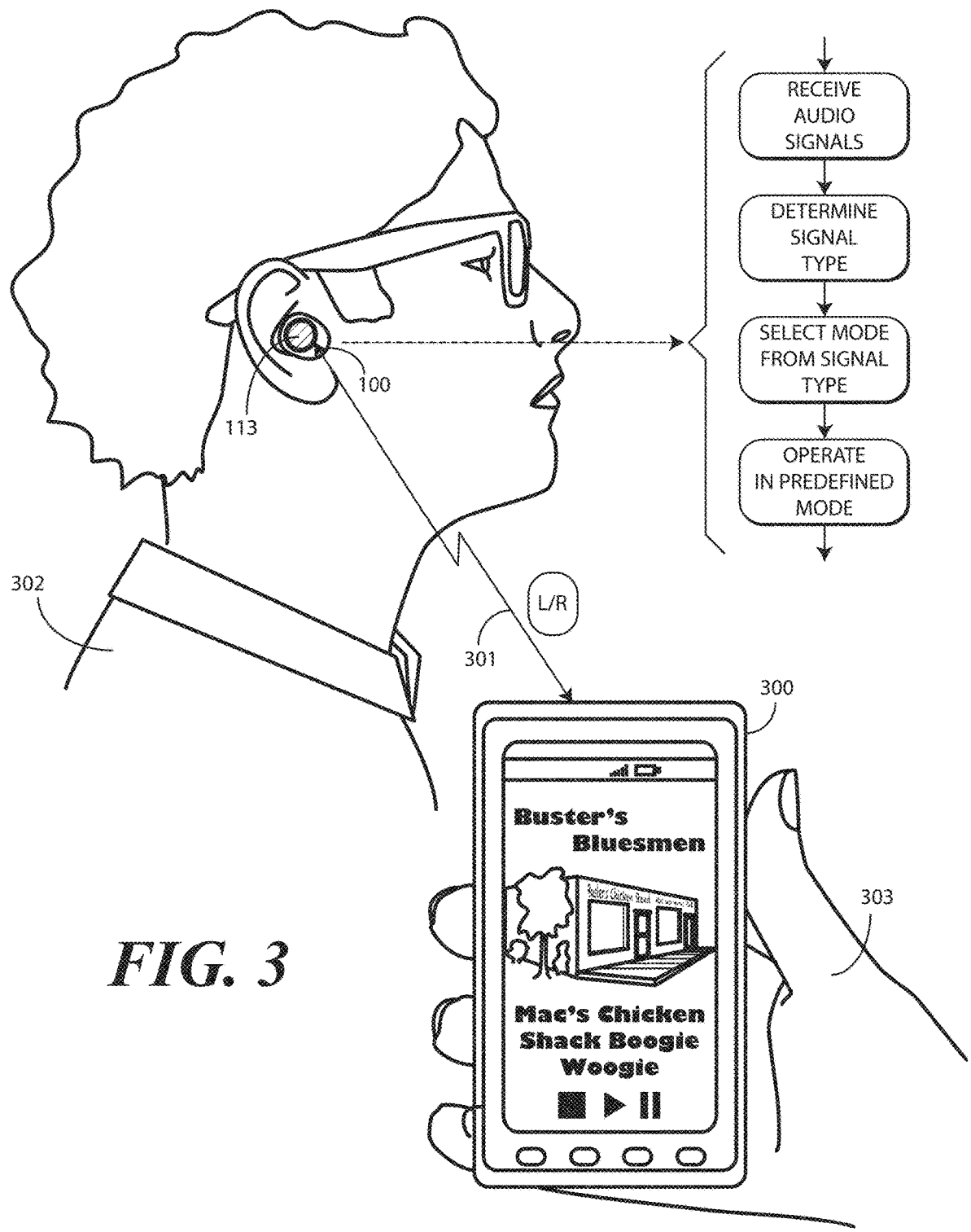
FIG. 3 illustrates one explanatory electronic device operating in conjunction with a companion electronic device, along with one or more method steps, in accordance with one or more embodiments of the disclosure.
Figure 4:
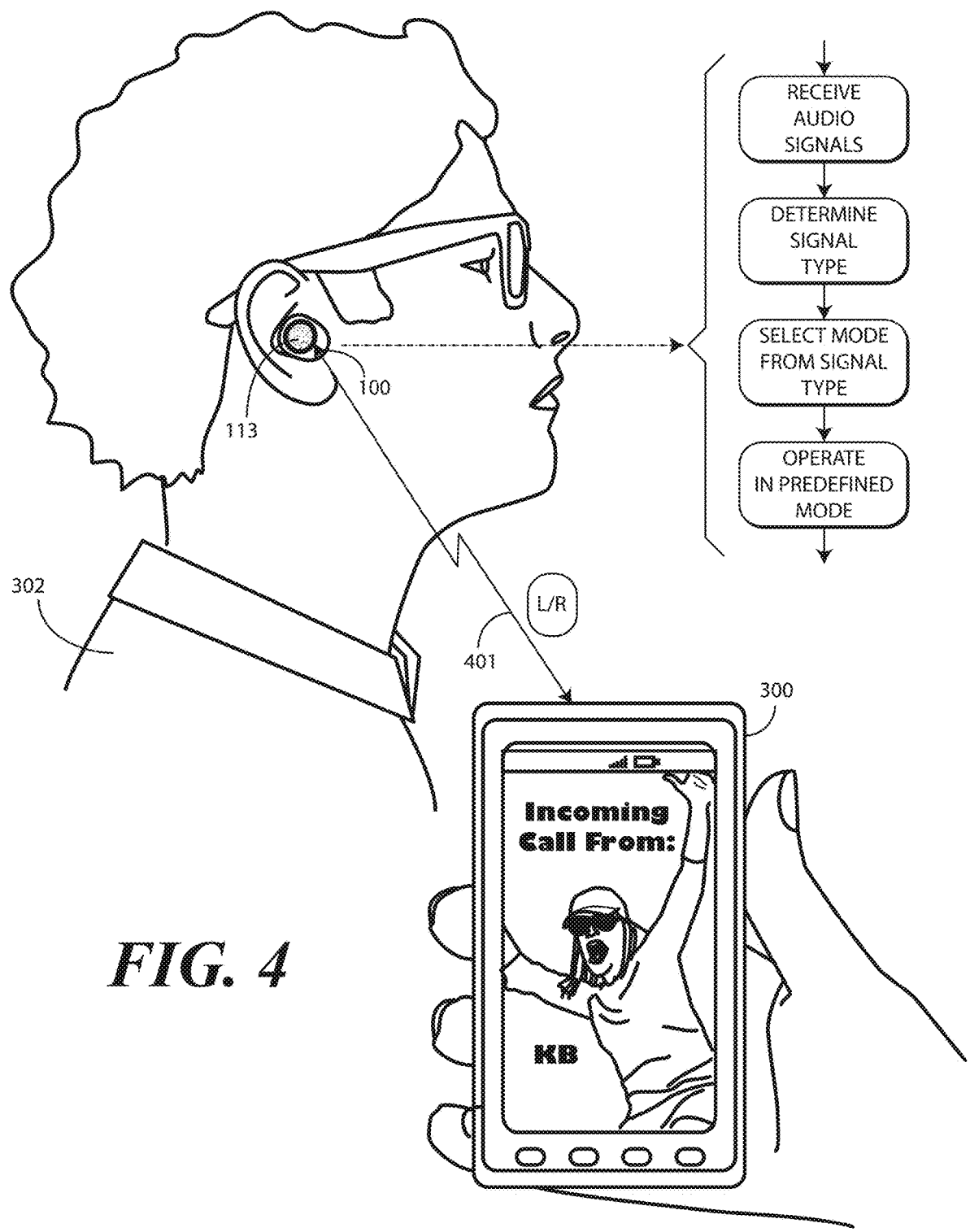
FIG. 4 illustrates another explanatory electronic device operating in conjunction with a companion electronic device, along with one or more method steps, in accordance with one or more embodiments of the disclosure.
Figure 5:
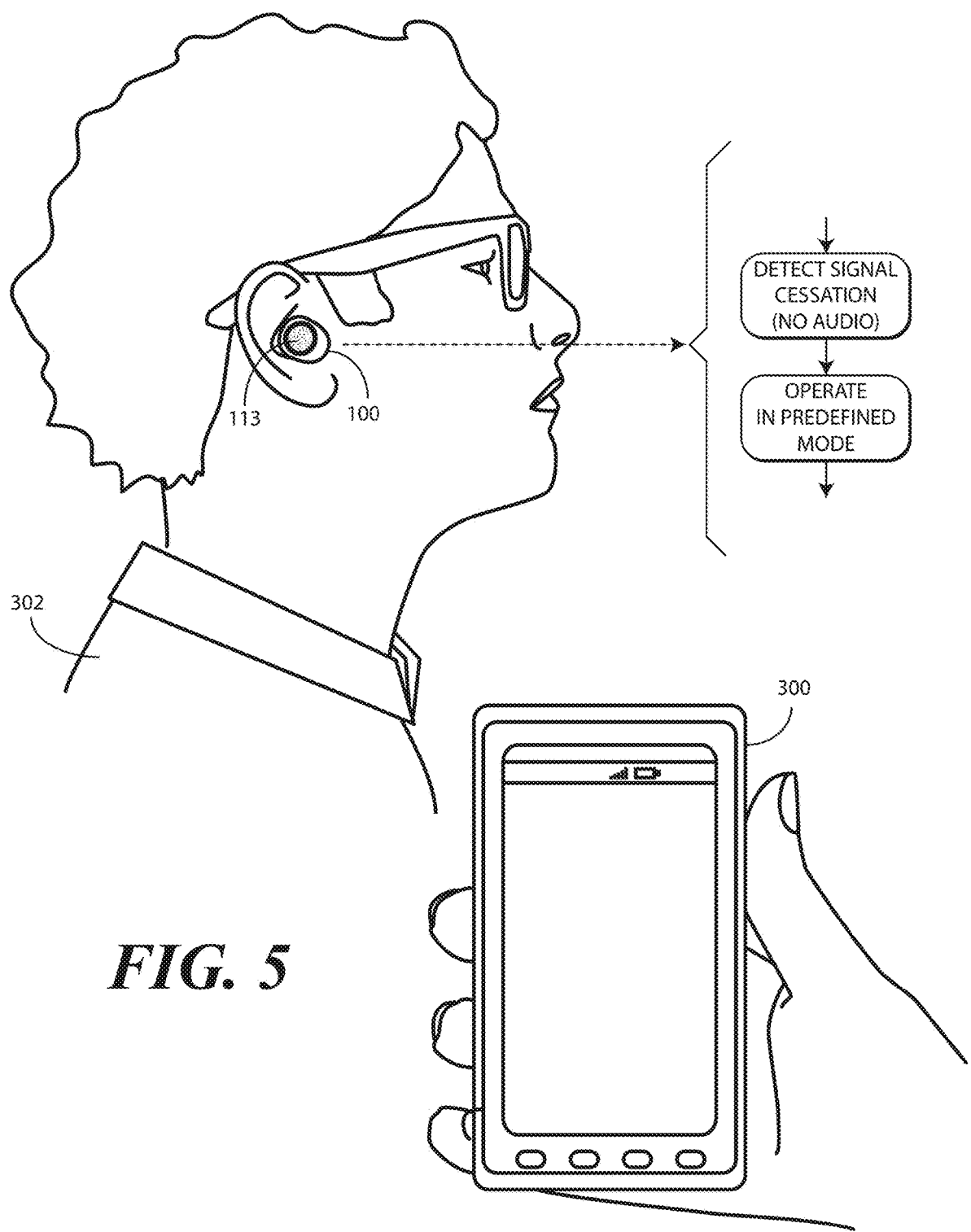
FIG. 5 illustrates still another explanatory electronic device operating in conjunction with a companion electronic device, along with one or more method steps, in accordance with one or more embodiments of the disclosure.

Now that various hardware components have been described, attention will be turned to methods of using electronic devices in accordance with one or more embodiments of the disclosure. Turning now to FIGS. 3-5, illustrated therein is one explanatory method to present a status indicator to others indicating the status of the authorized user of the electronic device. In one or more embodiments, the "status" of the authorized user of the electronic device means an indication of whether the authorized user of the electronic device is willing to be disturbed. In this sense, the status indicator (210) acts like a virtual "do not disturb" sign for the electronic device. More detailed methods will be described thereafter with reference to subsequent figures.

Beginning with FIG. 3, illustrated therein is the system of FIG. 1 in operation. An authorized user 302 of the electronic device 100 is shown using the system. As shown, the authorized user 302 of the electronic device has positioned the electronic device 100 in their right ear, with a second electronic device disposed in the left ear (not shown).

The authorized user 302 is holding the audio source (101) in their hand 303. Here, the audio source (1010) is a companion electronic device 300 configured as a smartphone. The audio source (101) could take other forms. Illustrating by example, the audio source (101) could be configured as a digital audio player, such as a MP3 player. Alternatively, the audio source (101) may be a personal computer or other portable computing device. The audio source (101) could be a streaming server in communication with the electronic device 100 across a network as well.

In this illustrative embodiment, the audio source (101) comprises a companion electronic device 300 configured as a smartphone capable of both making telephone calls and storing and playing music and multimedia content comprising music.

As shown, an electronic device 100 is receiving, with a communication device (204) audio signals 301 from a companion electronic device 300, which is shown illustratively as a smartphone. The authorized user 302 of the electronic device 100 has configured the companion electronic device 300 as a music player, with the track, "Mac's Chicken Shack Boogie Woogie," 203 by the renowned artist Buster and his Bluesmen, playing. Album cover art of this sensational tune is presented on a display of the companion electronic device 300.

As shown in FIG. 3, audio signals 301 are music audio signals since the companion electronic device 300 is operating in a music player mode. The audio signals 301 comprise electronic audio signals of the song being played, namely, Mac's Chicken Shack Boogie Woogie by the infamous Buster and his Bluesmen.

In one or more embodiments, the one or more processors (202) of the electronic device determine, from the audio signals 301, an audio type of the audio signals. In this illustrative example, the audio type of the audio signals 301 is that of music signals.

In one or more embodiments, when the audio signals 301 are of a first predefined audio type, the one or more processors (202) operate the status indicator (210) in a first state (130). By contrast, where the audio signals 301 are of a second predefined audio type, the one or more processors (202) operate the status indicator (210) in a second state (131). In one or more embodiments, the first state (130) and the second state (131) identify a status function indicating a status of the authorized user 302 of the electronic device 100. In one or more embodiments, the status of the authorized user 302 of the electronic device 100 indicates to third parties whether the authorized user 302 of the electronic device 100 wishes to be disturbed. When, for example, the status indicator output 113 is red, this means the authorized user 302 of the electronic device 100 is busy and does not wish to be disturbed. By contrast, when the status indicator output 113 is yellow, this means that the authorized user 302 of the electronic device 100 is busy, but does not mind being disturbed.

In one or more embodiments, the one or more processors (202) of the electronic device 100 operate the status indicator (210) of the electronic device in the first state (130) when the audio signals 301 comprise telephone call audio signals. Said differently, when the first predetermined audio type comprises telephone call audio signals, the one or more processors (202) operate the status indicator (210) in the first state (130), thereby causing the status indicator output 113 to be red light.

By contrast, in one or more embodiments the one or more processors (202) operate the status indicator (210) of the electronic device 100 in the second state when the audio signals 301 comprise music audio signals. Said differently, when the second predetermined audio type comprises music audio signals, the one or more processors (202) operate the status indicator (210) in the second state (131), thereby causing the status indicator output 113 to be yellow light.

In this illustrative example, the audio signals 301 are of the second predetermined type due to the fact that they are music audio signals. Accordingly, the one or more processors (202) of the electronic device 100 operate the status indicator (210) in the second state (131). Accordingly, the status indicator (210) causes the status indicator output 113 to be the emission of yellow light. In one or more embodiments, the emission of yellow light means that the authorized user 302 of the electronic device 100 is busy, but can be disturbed.

Turning now to FIG. 4, the electronic device 100 is again receiving, with a communication device (204), audio signals 401 from the companion electronic device 300. As shown in FIG. 4, audio signals 401 are telephone call audio signals due to the fact that the companion electronic device 300 is operating in a mobile telephone mode. An incoming call is being received from KB, and the authorized user 302 is actively engaged in a telephone conversation with KB. Note that while the telephone conversation is shown as being a voice call in FIG. 4, it could be a multimedia conversation as well, with video signals being received in addition to voice signals.

In one or more embodiments, the one or more processors (202) of the electronic device 100 determine, from the audio signals 401, an audio type of the audio signals. In this illustrative example, the audio type of the audio signals 401 is that of telephone call signals.

In one or more embodiments, when the audio signals 401 are of a first predefined audio type, the one or more processors (202) operate the status indicator (210) in a first state (130). By contrast, where the audio signals 401 are of a second predefined audio type, the one or more processors (202) operate the status indicator (210) in a second state (131).

In this illustrative example, the audio signals 401 are of the first predetermined type due to the fact that they are telephone call signals. Accordingly, the one or more processors (202) of the electronic device 100 operate the status indicator (210) in the first state (130). Accordingly, the status indicator (210) causes the status indicator output 113 to be the emission of red light. In one or more embodiments, the emission of red light means that the authorized user 302 of the electronic device 100 is busy and does not wish to be disturbed.

Turning now to FIG. 5, in one or more embodiments the one or more processors (202) of the electronic device 100 are also operable to detect a cessation of the receipt if the audio signals (301,401) from the companion electronic device 300. This has occurred in FIG. 5, as the companion electronic device is no longer operating in either the music player mode of operation or the mobile telephone mode of operation.

In one or more embodiments, when this occurs, the one or more processors (202) of the electronic device 100 operate the status indicator (210) in the third state (132). In one or more embodiments, the third state (132), like the first state (130) and the second state (131), identifies a status function indicating a status of the authorized user 302 of the electronic device 100. As noted above, in one or more embodiments the status of the authorized user 302 of the electronic device 100 indicates to third parties whether the authorized user 302 of the electronic device 100 wishes to be disturbed. When, for example, the status indicator output 113 is green, this means the authorized user 302 of the electronic device 100 is available, not busy, and does not mind being disturbed.

In this illustrative example, the audio signals (301,401) have ceased. Accordingly, the one or more processors (202) of the electronic device 100 operate the status indicator (210) in the third state (132). Accordingly, the status indicator (210) causes the status indicator output 113 to be the emission of green light. In one or more embodiments, the emission of red light means that the authorized user 302 of the electronic device 100 is busy and does not wish to be disturbed.

Thus, by comparing FIGS. 3-5 it can be seen that, in one or more embodiments, the one or more processors (202) of the electronic device 100 operate the status indicator (210) in a first state (130), thereby causing the status indicator output 113 to be red when the electronic device 100 is receiving telephone call signals. By contrast, the one or more processors (202) of the electronic device 100 operate the status indicator (210) in a second state (131), thereby causing the status indicator output 113 to be yellow when the electronic device 100 is receiving music playback signals. The one or more processors (202) of the electronic device 100 operate the status indicator (210) in a third state (132), thereby causing the status indicator output 113 to be green, when the received audio signals cease.

Figure 6:
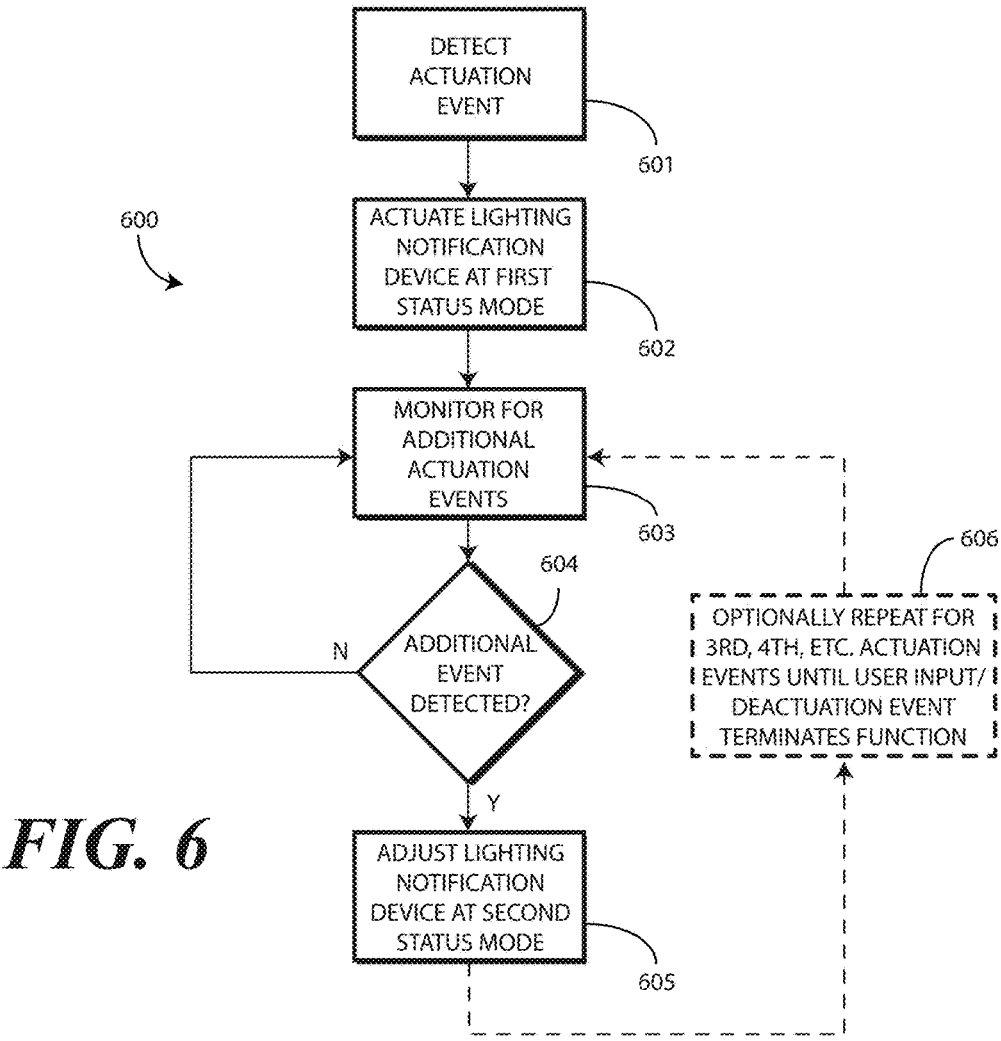
FIG. 6 illustrates one explanatory method in accordance with one or more embodiments of the disclosure.

Embodiments of the disclosure contemplate that in addition to this automatic control of the status indicator (210) as a function of whether the electronic device 100 is engaging in a telephone call, music playback, or being idle, other mechanisms for controlling the status indicator (210) are beneficial as well. Illustrating by example, the authorized user 302 of the electronic device 100 may be neither engaged in a telephone call nor listening to music, but may not want to be disturbed. Accordingly, it can be advantageous to have other mechanisms for controlling the status indicator (210) as well. Turning now to FIG. 6, illustrated therein is one explanatory method 600 illustrating how this can occur.

Beginning at step 601, one or more sensors (206) of an electronic device (100) detect a first actuation event input. In one or more embodiments, the first actuation event input causes the actuation of the status indicator (210). In one or more embodiments, this actuation causes the status indicator (210) to transition from a first state (129), where the status indicator (210) is OFF, to a second state (130), where the status indicator (210) presents a first color, first text, first graphical indicia, or other information. In one or more embodiments, such as where there are only three states, this actuation causes the status indicator (210) to change from one of the first state (129), the second state (130), or the third state (131), to another of the first state (129), the second state (130), or the third state (131).

For example, as described above with reference to FIG. 1, in one or more embodiments the first actuation event input causes the status indicator (210) of the electronic device (100) to transition from a first state (129), where the status indicator (210) is OFF, to a second state (130), where the status indicator (210) projects red light from the electronic device (100). Accordingly, in one or more embodiments the actuation event input detected at step 601 may request that one or more processors (202) of the electronic device (100) cause a light source, operating in conjunction with the status indicator (210), and which may include a display, portion of a display, one or more light bands, or other device, to emit light of a predefined color to indicate the status of an authorized user of the electronic device (100) and, optionally, whether the authorized user (302) of the electronic device (100) can be disturbed.

In one or more embodiments, the authorized user (302) delivers manual input to the electronic device (100) to deliver the actuation event input at step 601. Illustrating by example, the user may make a gesture translating the electronic device (100) in three-dimensional space to cause the status indicator to turn ON by transitioning to a first state (129). Accordingly, in one or more embodiments, the actuation event input detected at step 601 comprises a gesture input.

The gesture input can take a variety of forms. Illustrating by example, in one embodiment the gesture input comprises a hand or other object approaching the electronic device (100), as detected by the one or more sensors (206). In another embodiment, the gesture input comprises a user twisting the electronic device (100) about a major or minor axis in three-dimensional space, as detected by the motion sensor (207) or the one or more sensors (206).

In still another embodiment, the user can deliver the gesture input by moving a hand or arm in predefined motions in close proximity to the electronic device (100), as detected by the one or more sensors (206). In yet another embodiment, the user can deliver gesture input by lifting, shaking, translating, or otherwise deliberately moving the electronic device (100) in three-dimensional space, as detected by the one or more motion sensors (207) or other sensors (206). Other examples of actuation event inputs will be described below with reference to FIG. 8. Still others will be obvious to those of ordinary skill in the art having the benefit of this disclosure.

In one or more embodiments, the first actuation event input detected at step 601 comprises a gesture input translating the electronic device (100) back and forth in three-dimensional space. For example, the gesture input can translate the electronic device (100) in a chopping motion in the three-dimensional space. In so doing, the authorized user (302) can shake the electronic device (100) up and down in a "chop chop" motion.

In one or more embodiments, this gesture input comprises a predefined gesture input associated with the status indicator (210) for actuation, operation, cessation of operation, and/or performance. Thus, the actuation event input detected at step 601 comprises a request for the status indicator (210) to cause the presentation of a predefined color at an output device in one or more embodiments.

The predefined status indicator (210) can vary, just as does the actuation event input.

Illustrating by example, in one embodiment the status indicator (210) comprises turning ON the status indicator (210). In another embodiment, the status indicator (210) comprises transitioning the status indicator (210) from one state to another, e.g., by transitioning the light being projected by the status indicator (210) from red to yellow, yellow to green, or green to OFF.

Thus, in one or more embodiments step 601 comprises an authorized user (302) of the electronic device (100) user delivering manual input to the electronic device (100) to actuate the status indicator (210), thereby causing the status indicator (210) to turn ON by transitioning to a first state (130). If the first state (130) is not the desired state, in one or more embodiments the authorized user (302) repeats the gesture, transitioning the status indicator (210) from one state to the next with each gesture, until state of the status indicator (210) is as desired. In one or more embodiments, the user can then turn the status indicator OFF by again repeating the gesture.

In one or more other embodiments, no manual input is required. Instead, the actuation event input received at step 601 comes from the one or more processors (202) of the electronic device (100), thereby causing operation of the status indicator (210) to occur automatically. One way in which this can occur was described above with reference to FIGS. 3-5.

In the illustrative embodiment of FIG. 6, the one or more processors (202) of the electronic device (100) are operable with a companion electronic device (300) that includes a calendaring application. When an event scheduled in the calendaring application commences, the one or more processors (202) can deliver an actuation event input at step 601, thereby controlling the status indicator (210). When the event terminates, the one or more processors (202) can cause status indicator (210) to cease the presentation of status information pertaining to the authorized user of the electronic device (100). In one or more embodiments, the authorized user of the electronic device (100) can define, when creating the event in the calendaring application, in what state the status indicator (210) should operate while the event is in progress.

At step 602, the status indicator (210) actuates, performs, and/or operates the status indicator (210) in response to receiving the actuation event input at step 601. Using the three-color example set forth above, in one or more embodiments when a first "chop chop" motion of the electronic device (100) or calendaring event or incoming communication or other actuation event input is detected at step 601, at step 602 the one or more processors (202) cause the status indicator (210) turn ON, i.e., start and continue emitting light.

Thus, in one or more embodiments when the electronic device (100), using one or more sensors (206), detects the actuation event input at step 601, one or more processors (202) of the electronic device (100) can actuate, perform, and/or operate the status indicator (210) in response at step 602. Advantageously, this use of a actuation event input, one example of which is a gesture input translating the electronic device (100) in three-dimensional space, provides a natural, immediate, and intuitive method of controlling the electronic device (100) without the necessity of delivering voice commands or touch input to the user interface actuator (103) of the electronic device (100). Using the method 600 of FIG. 6, a user can trigger, activate, actuate, or initiate control features and functions and perform control operations via simple gesture motions to provide third parties with indications of whether the authorized user of the electronic device (100) is able to be disturbed.

In one or more embodiments, step 602 comprises the one or more processors (202) operating the status indicator (210) in a first state (130) in response to the first actuation event input received at step 601. Illustrating by example, in one or more embodiments step 602 comprises the one or more processors (202) causing the status indicator (210) to turn red, thereby indicating that the authorized user of the electronic device (100) does not want to be disturbed.

Embodiments of the disclosure contemplate that when a actuation event input, such as a gesture motion translating the electronic device in a back and forth or chopping motion in three-dimensional space, a calendaring event, an incoming communication, or other actuation event input is detected at step 601, causes the one or more processors (202) to actuate and/or operate the status indicator (210), the initial state (130) of the status indicator (210) may not be the one desired by the authorized user of the electronic device (100). Accordingly, at step 603, the one or more sensors (206) of the electronic device (100) continue to monitor for additional actuation event inputs. In one or more embodiments, step 603 occurs while the one or more processors (202) of the electronic device (100) are operating the status indicator (210) in the first state (130) at step 602. Thus, in the three-color example described above with reference to FIG. 1, step 603 occurs while the one or more processors (202)

are operating the status indicator (210) in the first state (130) of being red, which is an indication that the authorized user of the electronic device (100) does not want to be disturbed in one or more embodiments.

Decision 604 then detects, with the one or more sensors (206) of the electronic device (100), whether a second actuation event input is detected while the status indicator (210) is operating in the first state (130). In one or more embodiments, when the one or more sensors (206) detect a second actuation event input at decision 604 while the status indicator (210) is operating in the first state (130), the one or more processors (202) transition the status indicator (210) from operating in the first state to a second state (131) at step 605. Accordingly, in one or more embodiments, step 605 comprises the one or more processors (202) of the electronic device (100) operating the status indicator (210) in a second state (131) in response to decision 604 detecting the second actuation event input, which turns the status indicator (210) from red to yellow, thereby indicating that the authorized user of the electronic device (100) is busy, but does not mind being disturbed. In one or more embodiments, the second state (131) of step 605 is different from the first state (130) at step 602.

In one or more embodiments, the second actuation event input and the first actuation event input are the same. Illustrating by example, the first actuation event input and the second actuation event input can each be "chop chop" motions translating the electronic device (100) back and forth in three-dimensional space. In other embodiments, the first actuation event input and the second actuation even input are different. For instance, the first actuation event input can be the "chop chop" motion, while the second actuation event input comprises a gesture twisting the electronic device (100) in three-dimensional space. Similarly, where the first actuation event input comprises the commencement of a calendared event in a calendar application operable with the one or more processors (202) of the electronic device (100), the second actuation event input can comprise the cessation of the calendared event, and so forth.

It should be noted that portions of the method 600 can repeat at step 606 for any desired number of iterations to provide increased granularity and resolution to the state changing process occurring at the status indicator (210). For example, using a scale of "one to four" for differences in state, in a first iteration of the method 600 step 602 may comprise operating the status indicator (210) in a first state (130) in response to a first actuation event input, thereby turning the status indicator (210) on and transitioning it to a red color, which indicates that an authorized user of the electronic device (100) does not want to be disturbed. In this first iteration of the method 600, step 605 may comprise transitioning operation of the status indicator (210) to a second state (131), which makes the status indicator (210) turn yellow, thereby indicating that the authorized user of the electronic device (100) is busy, but does not mind being disturbed in response to detecting the second actuation event input occurring while the status indicator (210) is operating in the first state.

At step 606, the method 600 can include transitioning operation of the status indicator (210) to a third state (132), which transitions the color of the status indicator (210) from yellow to green, thereby indicating that the authorized user of the electronic device (100) is free and can be disturbed in response to detecting a third actuation event input occurring while the status indicator (210) is operating in the second state (131). Thereafter, at step 605, the method 600 can include transitioning operation of the status indicator (210) back to the first state (129), where the status indicator (210) is presenting no color and is instead OFF. In one or more embodiments this occurs in response to detecting a fourth actuation event input occurring while the status indicator (210) is operating in the third state (132), and so forth. In one or more embodiments where there are more than four states, this process can repeat until the final state is reached, e.g., a ten on the scale of one to ten for example Alternatively, the method 600 can terminate at step 606 when user input is received terminating the status indicator (210).

Figure 8:
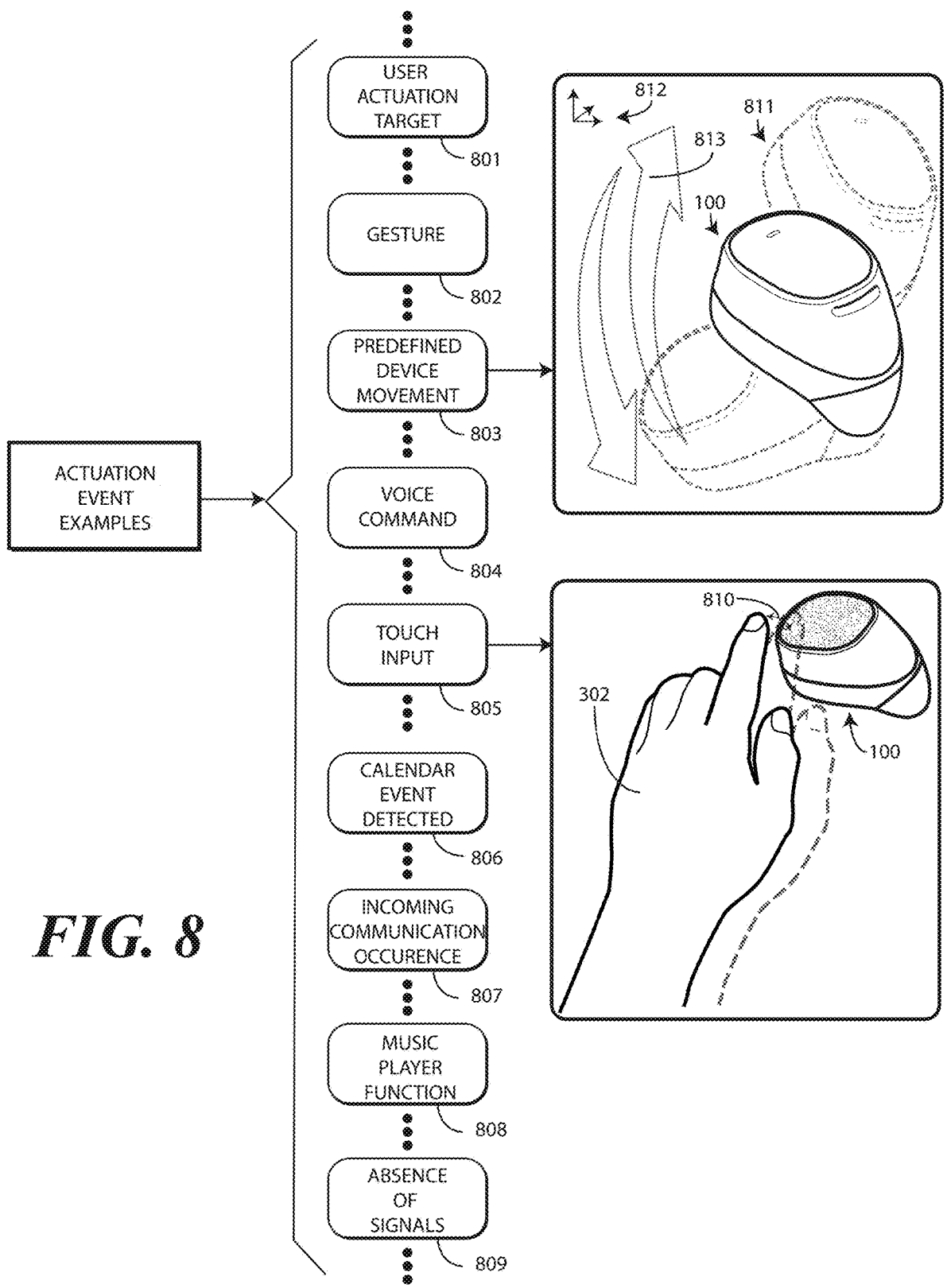
FIG. 8 illustrates examples of one or more actuation event inputs triggering the presentation of a status indicator on an electronic device in accordance with one or more embodiments of the disclosure.

Turning now to FIG. 8, illustrated therein are various actuation event inputs that can be used as one or both of the first actuation event input, the second actuation event input, and optionally the third or more actuation event input of FIG. 6. It should be noted that the first actuation event input and the second actuation event input (and/or additional actuation event inputs) can be the same actuation event input or different actuation event inputs. For example, where step (602) of FIG. 6 above comprises detecting a "chop chop" motion to actuate and/or operate the status indicator (210) in the first state (130), step (605) could comprise transitioning the status indicator (210) from the first state (130) to the second state (131) in response to detecting another "chop chop" motion while the status indicator (210) is operating in the first state (130).

Figure 9:
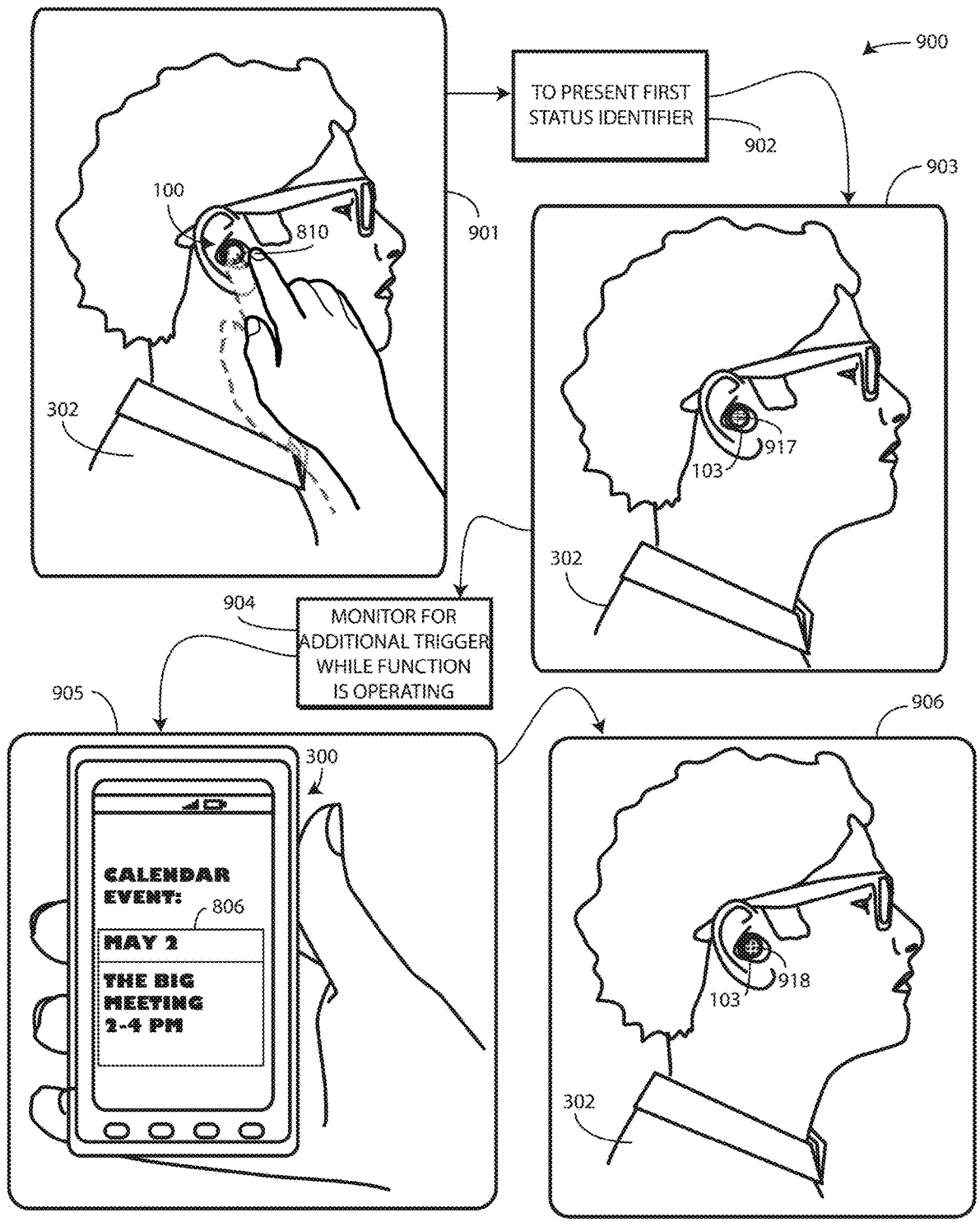
FIG. 9 illustrates another method in accordance with one or more embodiments of the disclosure.

In other embodiments, however, the first actuation event input and the second actuation event input can be different. For instance, where step (602) of FIG. 6 above comprises detecting a "chop chop" motion to actuate and/or operate the status indicator (210) in the first state (130), step (605) could comprise transitioning the status indicator (210) from the first state (130) to the second state (131) in response to detecting another gesture twisting the electronic device (100) in three-dimensional space while the status indicator (210) is operating in the first state (130), and so forth.

Where three or more actuation event inputs are employed, they can all be the same, all be different, or may alternate in predefined patterns. For instance, where step (602) of FIG. 6 above comprises detecting a "chop chop" motion to actuate and/or operate the status indicator (210) in the first state (130), and step (605) comprises transitioning the status indicator (210) from the first state (130) to the second state (131) in response to detecting another gesture twisting the electronic device (100) in three-dimensional space while the status indicator (210) is operating in the first state (130), a third actuation event input detected at step (606) in the form of another "chop chop" may cause the status indicator (210) to terminate operation. Alternatively, a third actuation event input detected at step (606) in the form of moving the electronic device (100) in spinning motion about a minor axis of the electronic device (100) may cause the status indicator (210) to transition to a third state (132), thereby causing the status indicator (210) to turn green so as to indicate that the authorized user of the electronic device (100) is not busy and can be interrupted, and so forth. Thus, it is to be understood that the actuation event inputs illustrated in FIG. 8 can be used in various combinations. FIG. 9, described below, will present one explanatory method demonstrating how the actuation event inputs can be used in combination. Moreover, the list of actuation event inputs shown in FIG. 8 is illustrative only, as numerous others will be obvious to those of ordinary skill in the art having the benefit of this disclosure.

A first example of an actuation event input is user manipulation of a user actuation target 801 at a user interface actuator (103) of an electronic device 100. In one or more embodiments, when a status indicator (210) becomes active, when the electronic device 100 is equipped with a display, one or more user actuation targets are presented on the display or other touch sensitive surface.

In one or more embodiments, a authorized user 302 can deliver touch or other forms of user input to the user actuation target to cause one or both of the one or more processors (202) of the electronic device 100 to actuate and/or operate the status indicator (210) in a first state (where the manipulation of the user actuation target 801 is used as a first actuation event input) and/or cause the one or more processors (202) of the electronic device 100 to transition operation of the status indicator (210) from the first state to a second (or higher) state (where the manipulation of the user actuation target 801 is used as a second actuation event input) upon the one or more sensors (206) of the electronic device 100 detecting the manipulation of the user actuation target 801 while the one or more processors (202) operate the user interface component in the first (or higher) state.

As described above with reference to FIGS. 1, a second example of an actuation event input is that of a user gesture 802. The user gesture 802 could be a gesture made about the electronic device 100, such as waving a hand above the electronic device 100 as detected by the one or more sensors (206) in one or more embodiments. The user gesture 802 could comprise moving a hand or other object toward, or away from, the electronic device 100 as detected by the one or more sensors (206) in one or more embodiments. Other forms of user gestures 802 will be obvious to those of ordinary skill in the art having the benefit of this disclosure.

In other embodiments, the actuation event input comprises a predefined movement 803 of the electronic device 100 in three-dimensional space 812. In one or more embodiments, one or both of the first actuation event input or the second actuation event input comprise gesture inputs translating the electronic device 100 in three-dimensional space 812 in accordance with a predefined movement 803.

For instance, the predefined movement 803 can translate or otherwise move the electronic device 100 in a predefined motion in three-dimensional space 812. Illustrating by example, in one or more embodiments an authorized user 302 can translate 811 the electronic device 100 back and forth in three-dimensional space 812. As shown in this example, the electronic device 100 is translating 811 in a chopping motion 813 in three-dimensional space 812. Other predefined movements 803 translating or moving the electronic device 100 in three-dimensional space 812 will be obvious to those of ordinary skill in the art having the benefit of this disclosure.

Another example of an actuation event input comprises a voice command 804. The authorized user 302 may deliver a voice command 804 such as "turn on do not disturb" to cause the one or more processors (202) of the electronic device 100 to actuate and/or operate the status indicator (210) in a first state. Similarly, the authorized user 302 may use another voice command 804 such as "tell people I'm busy but don't mind interruption" or "turn from red to yellow" to cause the one or more processors (202) of the electronic device 100 to transition operation of the status indicator (210) from the first state to a second (or higher) state upon the audio input (208) the electronic device 100 detecting this voice command 804 while the one or more processors (202) operate the user interface component in the first (or higher) state, and so forth. Other examples of voice commands 804 will be obvious to those of ordinary skill in the art having the benefit of this disclosure.

Still another example of an actuation event input is touch input 805. In one or more embodiments, a authorized user 302 may deliver touch input 805 in the form of a tap, double-tap 810, slide, twist, or grasp to cause the status indicator (210) respond. Illustrating by example, the authorized user 302 may double-tap 810 a touch-sensitive surface or a display of the electronic device 100 to cause the one or more processors (202) of the electronic device 100 to actuate and/or operate the status indicator (210) in a first state. Similarly, the authorized user 302 may slide a finger along the touch-sensitive surface or display to cause the one or more processors (202) of the electronic device 100 to transition operation of the status indicator (210) from the first state to a second (or higher) state upon the touch-sensitive surface or display of the electronic device 100 while the one or more processors (202) operate the status indicator (210) in the first (or higher) state, and so forth. Other examples of touch input 805 will be obvious to those of ordinary skill in the art having the benefit of this disclosure.

Still another example of an actuation event input is a calendar event occurrence 806 scheduled in a calendaring application operable with the one or more processors (202) of the electronic device 100 or, alternatively, operable with one or more processors of a companion electronic device (300). Illustrating by example, when an event scheduled in the calendaring application commences, the one or more processors (202) can cause the status indicator (210) to transition to a busy state by presenting either red or yellow light. When the event terminates, the one or more processors (202) can cause the status indicator (210) to transition to an interruptible state by presenting either yellow or green light. In one or more embodiments, a user can define, when creating the event in the calendaring application, which state of the status indicator (210) should occur while the event is in progress.

Still another example of an actuation event input comprises an incoming communication occurrence 807. In one or more embodiments, when an incoming call is received, the one or more processors (202) can cause the status indicator (210) to transition to a busy state by presenting either red or yellow light. When the incoming call terminates, the one or more processors (202) can cause the status indicator (210) to transition to an interruptible state by presenting either yellow or green light. In one or more embodiments, a user can define what state of the status indicator (210) should occur while the communication is in progress. Illustrating by example, text messages may cause the status indicator (210) to emit yellow light, while phone calls cause the status indicator (210) to emit red light. When no incoming communication is occurring, the status indicator (210) may present green light while operational, and so forth.

Still another example of an actuation event input comprises music playback 808. In one or more embodiments, when music is being played, either with or without an accompanying video, the one or more processors (202) can cause the status indicator (210) to transition to a busy state by presenting either red or yellow light. When music playback ceases, the one or more processors (202) can cause the status indicator (210) to transition to an interruptible state by presenting either yellow or green light. In one or more embodiments, a user can define what state of the status indicator (210) should occur while music is playing. When no music is playing, the status indicator (210) may present green light while operational, and so forth.

In another embodiment, the actuation event input comprises an absence of any received audio signals 809. As described above with reference to FIG. 5, in one or more embodiments when there is an absence of received communication signals as the communication device (204) of the electronic device 100, the one or more processors (202) cause the status indicator (210) to emit green light, thereby indicating that the authorized user 302 is free and does not mind being interrupted.

Figure 7:
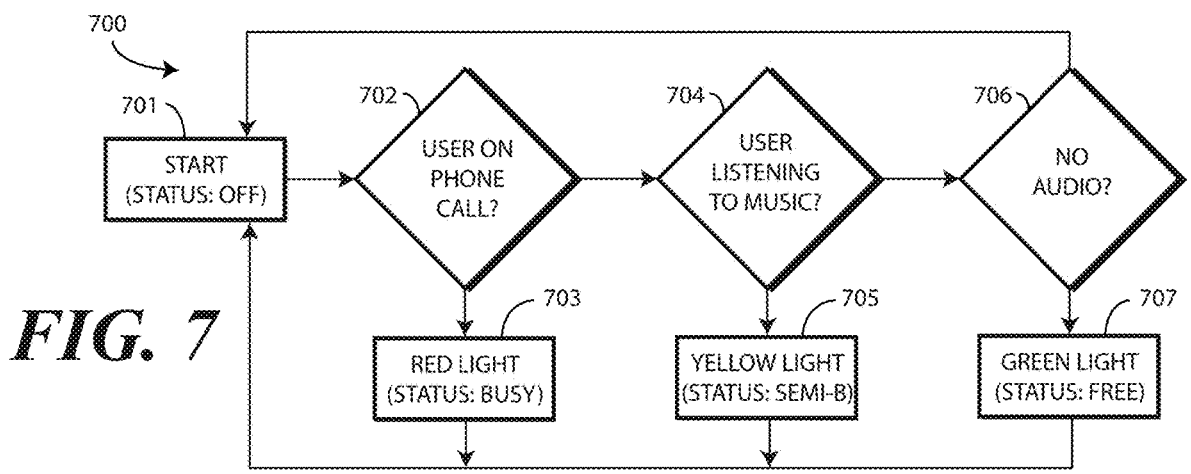
FIG. 7 illustrates another explanatory method in accordance with one or more embodiments of the disclosure.

It should be noted that the various actuation event inputs of FIG. 8 can be used in combination. FIGS. 7-8 illustrate methods demonstrating how this can occur. The use of the actuation event inputs can control the status indicator (210) automatically or manually. FIG. 7 illustrates an automatic mode, while FIG. 8 illustrates a manual mode.

Beginning with FIG. 7, illustrated therein is one method 700 for automatically controlling a status indicator (210) in an electronic device (100) in accordance with one or more embodiments of the disclosure. The method 700 begins at step 701 where the status indicator (210) is initially OFF. As noted above, the authorized user (302) of the electronic device can actuate the status indicator (210) manually in one or more embodiments. However, in other embodiments actuation of the status indicator (210) occurs automatically. The method 700 of FIG. 7 illustrates one such automatic method.

Decision 702 determines whether an incoming communication occurrence (807), such as an incoming phone call, is occurring. Where it is, in one or more embodiments the method 700 moves to step 703 where the status indicator (210) transitions to a busy state. In one or more embodiments, the status indicator (210) presents red light in the busy state, thereby indicating that the authorized user of the electronic device does not want to be disturbed.

Where decision 702 determines that no received audio signals (809) are present, decision 704 determines whether a music playback (808) is occurring. Where it is, in one or more embodiments the method 700 moves to step 705 where the status indicator (210) transitions to a semi-busy state. In one or more embodiments, the status indicator (210) presents yellow light in the semi-busy state, thereby indicating that the authorized user of the electronic device is busy, but can be disturbed if necessary.

Where decision 704 fails to determine that music playback (808) is occurring, decision 706 determines whether there is an absence of received audio signals (809). Where there is, in one or more embodiments the method 700 moves to step 707 where the status indicator (210) transitions to a free state. In one or more embodiments, the status indicator (210) presents green light in the free state, thereby indicating that the authorized user of the electronic device is free for any and all shenanigans. Alternatively, where decision 704 determines that audio signals are being received, decision 706 simply sends the method to step 707, where the method 700 can repeat thereafter.

Accordingly, the method 700 of FIG. 7 describes a situation where an electronic device (100), configured in accordance with embodiments of the disclosure, includes a communication device (204). Decision 702 and decision 704 determine whether the communication device (204) is receiving audio signals from a companion electronic device (300).

One or more processors (202) of the electronic device (100) are operable with the communication device (204). A status indicator (210) is operable with the one or more processors (202) in at least a first state (130) and a second state (131) that is different from the first state (130). The one or more processors (202) operate the status indicator (210) in the first state (130) when the audio signals are of a first type, which comprises voice telephone audio call signals received from a telephone application operating at the companion electronic device (300) in this example By contrast, the one or more processors (202) operate the status indicator (210) in the second state (131) when the audio signals are of a second type, which in this example comprises music playback audio signals received from a music player application operating at the companion electronic device (300).

When no signals are received, the one or more processors (202) optionally operate the status indicator (210) in a third state (132). Said differently, the one or more processors (202) operating the status indicator (210) in a third state (132) upon cessation of receipt of the audio signals from the companion electronic device (300), with the status indicator (210) emitting green light when operating in the third state (132).

Turning now to FIG. 9, illustrated therein is a method 900 of using one or more of the actuation event inputs described above with reference to FIG. 8 in accordance with one or more embodiments of the disclosure. In the example illustrated in FIG. 9, an electronic device 100 is equipped with a status indicator (210). In this illustrative example, the status indicator (210) can be OFF, red (indicating busy), yellow (indicating semi-busy), or green (indicating free).

In the method 900 of FIG. 9, two illustrative actuation event inputs have been selected from FIG. 8, namely, the touch input (805) and the calendar event occurrence (806). These are explanatory only. As noted above, any of the trigger inputs described above with reference to FIG. 8 could be used alone or in combination.

At step 901, the authorized user 302 of the electronic device 100 delivers a double-tap 810 to a touch sensor (201) of the electronic device (100). At step 902, one or more processors (202) of the electronic device 100 operable with the touch sensor (201) cause the status indicator (210) to present red light 917 from the user interface actuator 103. As shown at step 903, this results in the user interface actuator 103 turning red, thereby indicating the authorized user 302 is busy and does not wish to be disturbed.

At step 904, the one or more processors (202) of the electronic device 100 monitor for another actuation event input while the status indicator (210) causes the user interface actuator 103 to be red. At step 905, the one or more processors (202) detect, using the one or more sensors (206) of the electronic device 100, a calendar event occurrence 806 in a calendar application operating on a companion electronic device 300.

At step 906, in response to the one or more processors (202) detecting the calendar event occurrence 806, the one or more processors (202) cause the status indicator (210) to transition to the semi-busy state, thereby presenting yellow light 918 at the user interface actuator 103. The authorized user 302 has configured the status indicator (210) of the electronic device 100 to present yellow light when meetings are scheduled in the calendaring application due to the fact that the authorized user 302 dislikes meetings. As such, while busy, the authorized user 302 is happy to be interrupted. Accordingly, a meeting calendar event results in the status indicator (210) transitioning from a busy state to a semi-busy state. It should be noted that the transition between the busy states of step 903 to the semi-busy state of step 906 in response to detecting the second actuation event input at step 905 while the status indicator (210) was operating in the first state is user definable in one or more embodiments. Had the calendar event occurrence 806 been date night with the wife, the authorized user 302 may have programmed the status indicator (210) to project red light 917 instead of yellow light 918, and so forth.

Figure 10:
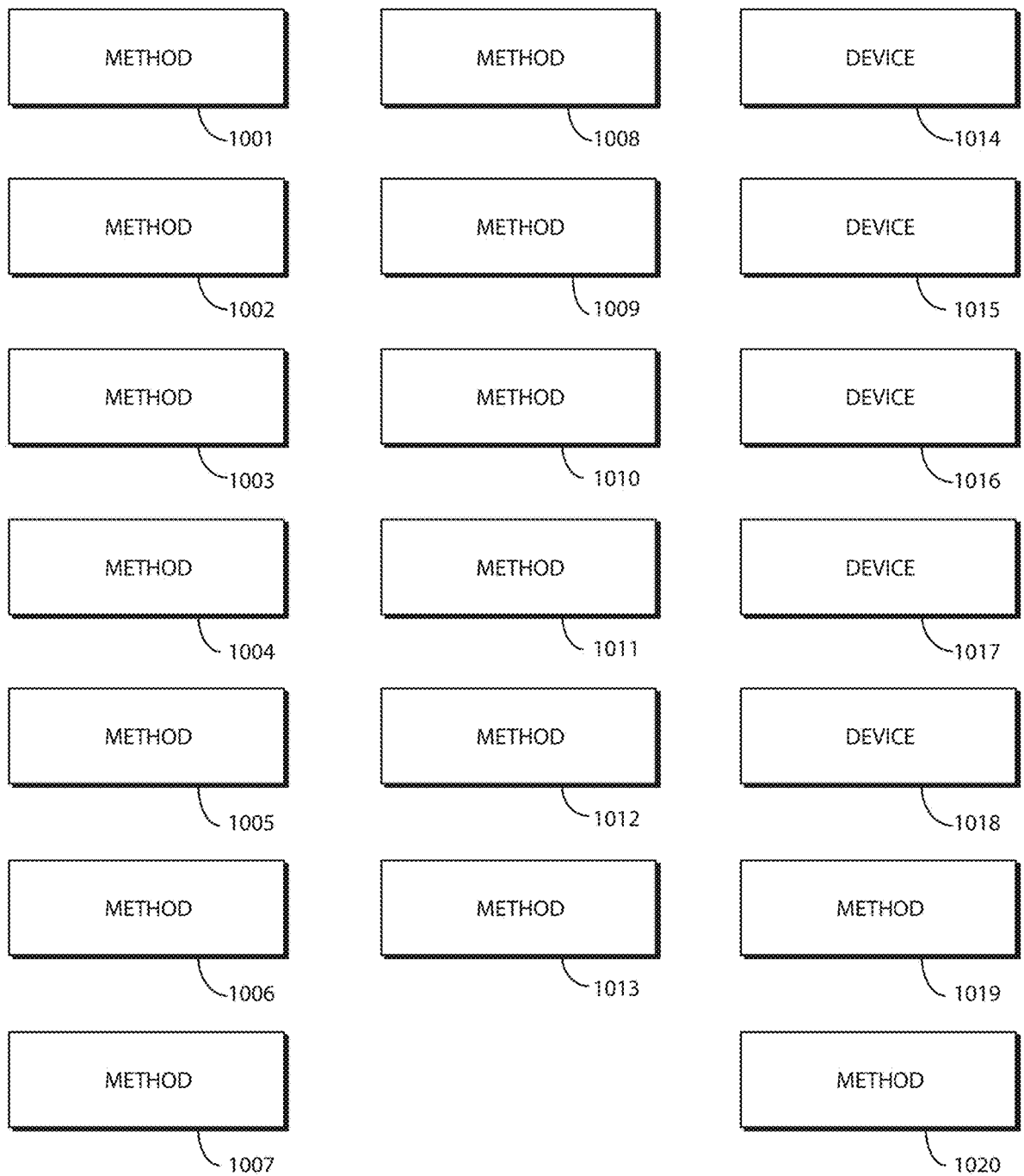
FIG. 10 illustrates various embodiments of the disclosure.

Turning now to FIG. 10, illustrated therein are various embodiments of the disclosure. The embodiments of FIG. 10 are shown as labeled boxes in FIG. 10 due to the fact that the individual components of these embodiments have been illustrated in detail in FIGS. 1-9, which precede FIG. 10. Accordingly, since these items have previously been illustrated and described, their repeated illustration is no longer essential for a proper understanding of these embodiments. Thus, the embodiments are shown as labeled boxes.

At 1001, a method in an electronic device comprises receiving, with a communication device of the electronic device, audio signals from a companion electronic device. At 1001, the method comprises determining, with one or more processors from the audio signals, an audio type of the audio signals.

At 1001, when the audio type is a first predetermined audio type, the method comprises operating, by the one or more processors, a status indicator in a first state. At 1001, when the audio type is a second predetermined audio type, the method comprises operating, by the one or more processors, the status indicator in a second state. At 1002, the first state and the second state of 1001 identify a status function indicating a status of an authorized user of the electronic device.

At 1003, the first predetermined audio type of 1001 comprises telephone call audio signals. At 1004, the status indicator of 1003 emits red light when operating in the first state.

At 1005, the second predetermined audio type of 1003 comprises music audio signals. At 1006, the status indicator of 1005 emits yellow light when operating in the second state.

At 1007, the method of 1001 further comprises detecting, with the one or more processors, a cessation of receipt of the audio signals from the companion electronic device. At 1007, the method of 1001 further comprises operating, by the one or more processors, the status indicator in a third state. At 1008, the status indicator of 1007 emits green light when operating in the third state.

At 1009, the method of 1007 further comprises detecting, with the one or more processors of the electronic device, an actuation event input requesting performance of the status indicator. At 1009, the method of 1007 further comprises changing, by the one or more processors, the status indicator from one of the first state, the second state, or the third state to another of the first state, the second state, or the third state.

At 1010, the actuation event input of 1009 comprises touch input upon a surface of the electronic device. At 1011, the actuation event input of 1009 comprises a gesture input translating the electronic device back and forth in three-dimensional space.

At 1012, the gesture input of 1011 translates the electronic device in a chopping motion in the three-dimensional space. At 1013, the actuation event input of 1009 comprises receiving signals of commencement of a calendar event in a calendaring application from the companion electronic device.

At 1014, an electronic device comprises a communication device receiving audio signals from a companion electronic device. At 1014, the electronic device comprises one or more processors operable with the communication device. At 1014, the electronic device comprises a status indicator operable with the one or more processors in at least a first state and a second state that is different from the first state. At 1014, the one or more processors operate the status indicator in the first state when the audio signals are of a first type and operating the status indicator in the second state when the audio signals are of a second type.

At 1015, the first type of 1014 comprises voice telephone call audio signals received from a telephone application operating at the companion electronic device. At 1016, the second type of 1014 comprises music playback audio signals received from a music player application operating at the companion electronic device.

At 1017, the status indicator of 1014 emits red light when operating in the first state. At 1017, the status indicator of 1014 emits yellow light when operating in the second state. At 1018, the one or more processors of 1014 operate the status indicator in a third state upon cessation of receipt of the audio signals from the companion electronic device. At 1018, the status indicator emits green light when operating in the third state.

At 1019, a method of operating an electronic device comprises detecting, with one or more sensors of the electronic device, a first actuation event input requesting performance of a status indicator. At 1019, the method comprises operating, by one or more processors operable with the one or more sensors, the status indicator in a first state in response to the first actuation event input.

At 1019, the method comprises detecting, with the one or more sensors, a second actuation event input while the status indicator is operating in the first state. At 1019, in response to the detecting the second actuation event input, the method comprises operating, by the one or more processors, the status indicator in a second state that is different from the first state.

At 1019, at least one of the first actuation events input or the second actuation event input comprises receiving audio signals from a companion electronic device of a predefined audio signal. At 1020, at least another of the first actuation even input or the second actuation event input of 1019 comprises an absence of received audio signals from a companion electronic device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   receiving, with a communication device of the electronic device, audio signals from a companion electronic device;

determining, with one or more processors from the audio signals, an audio type of the audio signals; and when the audio type is a first predetermined audio type, operating, by the one or more processors, a status indicator in a first state; and when the audio type is a second predetermined audio type, operating, by the one or more processors, the status indicator in a second state.

2. The method of claim 1, the first state and the second state identifying a status function indicating a status of an authorized user of the electronic device.

3. The method of claim 1, the first predetermined audio type comprising telephone call audio signals.

4. The method of claim 3, the status indicator emitting red light when operating in the first state.

5. The method of claim 3, the second predetermined audio type comprising music audio signals.

6. The method of claim 5, the status indicator emitting yellow light when operating in the second state.

7. The method of claim 1, further comprising:
detecting, with the one or more processors, a cessation of receipt of the audio signals from the companion electronic device; and
operating, by the one or more processors, the status indicator in a third state.

8. The method of claim 7, the status indicator emitting green light when operating in the third state.

9. The method of claim 7, further comprising:
detecting, with the one or more processors of the electronic device, an actuation event input requesting performance of the status indicator; and
changing, by the one or more processors, the status indicator from one of the first state, the second state, or the third state to another of the first state, the second state, or the third state.

10. The method of claim 9, the actuation event input comprising touch input upon a surface of the electronic device.

11. The method of claim 9, the actuation event input comprising a gesture input translating the electronic device back and forth in three-dimensional space.

12. The method of claim 11, the gesture input translating the electronic device in a chopping motion in the three-dimensional space.

13. The method of claim 9, the actuation event input comprising receiving signals of commencement of a calendar event in a calendaring application from the companion electronic device.

14. An electronic device, comprising:
a communication device receiving audio signals from a companion electronic device;
one or more processors operable with the communication device; and
a status indicator operable with the one or more processors in at least a first state and a second state that is different from the first state; and
the one or more processors operating the status indicator in the first state when the audio signals are of a first type and operating the status indicator in the second state when the audio signals are of a second type.

15. The electronic device of claim 14, the first type comprising voice telephone call audio signals received from a telephone application operating at the companion electronic device.

16. The electronic device of claim 14, the second type comprising music playback audio signals received from a music player application operating at the companion electronic device.

17. The electronic device of claim 14, the status indicator emitting:
red light when operating in the first state; and
yellow light when operating in the second state.

18. The electronic device of claim 14, the one or more processors operating the status indicator in a third state upon cessation of receipt of the audio signals from the companion electronic device, the status indicator emitting green light when operating in the third state.

19. A method of operating an electronic device, the method comprising:
detecting, with one or more sensors of the electronic device, a first actuation event input requesting performance of a status indicator;
operating, by one or more processors operable with the one or more sensors, the status indicator in a first state in response to the first actuation event input;
detecting, with the one or more sensors, a second actuation event input while the status indicator is operating in the first state; and
in response to the detecting the second actuation event input, operating, by the one or more processors, the status indicator in a second state that is different from the first state;
wherein at least one of the first actuation event input or the second actuation event input comprises receiving audio signals from a companion electronic device.

20. The method of claim 19, wherein at least another of the first actuation even input or the second actuation event input comprises an absence of received audio signals from a companion electronic device.

\* \* \* \* \*